US008190469B2

(12) United States Patent
Derasmo et al.

(10) Patent No.: US 8,190,469 B2
(45) Date of Patent: *May 29, 2012

(54) MULTIPLE CLIENT FIELD DEVICE DATA ACQUISITION AND STORAGE

(75) Inventors: Anthony Derasmo, Nanuet, NY (US); Robert Parrella, Scotch Plains, NJ (US); Brian Zolnoski, Cranford, NJ (US)

(73) Assignee: ACS State and Local Solutions, Inc, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,451

(22) Filed: Oct. 15, 2009

(65) Prior Publication Data

US 2010/0042482 A1 Feb. 18, 2010

Related U.S. Application Data

(62) Division of application No. 10/835,923, filed on Apr. 30, 2004, now Pat. No. 7,617,120.

(60) Provisional application No. 60/467,096, filed on Apr. 30, 2003.

(51) Int. Cl.
| | |
|---|---|
| *G07B 15/00* | (2006.01) |
| *G07B 15/02* | (2011.01) |
| *G06Q 10/00* | (2006.01) |
| *G06F 17/00* | (2006.01) |
| *G06F 15/16* | (2006.01) |
| *B60Q 1/48* | (2006.01) |

(52) U.S. Cl. ........ 705/13; 705/1.1; 705/418; 340/932.2; 709/201; 235/384

(58) Field of Classification Search .................... 705/13, 705/1.1, 418; 340/932.2; 709/201; 235/384
See application file for complete search history.

(56) References Cited

U.S. PATENT DOCUMENTS

| | | | |
|---|---|---|---|
| 5,740,050 A | 4/1998 | Ward, II | |
| 6,222,463 B1 | 4/2001 | Rai | |
| 6,823,317 B1 * | 11/2004 | Ouimet et al. | 705/13 |
| 7,869,625 B2 * | 1/2011 | Abebe | 382/115 |
| 2002/0008639 A1 * | 1/2002 | Dee | 340/932.2 |
| 2002/0029164 A1 | 3/2002 | Sugar et al. | |

(Continued)

FOREIGN PATENT DOCUMENTS

WO WO 98/41953 9/1998

(Continued)

OTHER PUBLICATIONS

International Search Report for PCT/US04/13596, Dec. 4, 2006 (10 pages).

*Primary Examiner* — Fadey Jabr
(74) *Attorney, Agent, or Firm* — Finnegan, Henderson, Farabow, Garrett & Dunner LLP

(57) ABSTRACT

A system is provided for acquiring and storing field information, comprising field devices operable to gather field information and receive updated file information. The field devices may be placed in cradles, which facilitate the transfer of the field and file information. A network is provided for receiving the field information from the field devices and transferring the field information to field devices located in the cradles. The system also provides a server operable to receive the field information from the network, store the field information in data tables assigned to at least one client, and transmit updated field information to the network.

25 Claims, 48 Drawing Sheets

U.S. PATENT DOCUMENTS

| | | |
|---|---|---|
| 2003/0065934 A1 | 4/2003 | Angelo et al. |
| 2003/0125981 A1 | 7/2003 | Pedrazzoli Pazos et al. |
| 2003/0135407 A1 | 7/2003 | Reinhardt et al. |
| 2004/0094621 A1 | 5/2004 | LaMont |
| 2004/0133464 A1 | 7/2004 | Erskine |
| 2004/0254900 A1 | 12/2004 | Reinhard |
| 2006/0011720 A1 * | 1/2006 | Call .............................. 235/383 |
| 2006/0106504 A1 | 5/2006 | Carpenter |
| 2007/0179912 A1 | 8/2007 | Key |

FOREIGN PATENT DOCUMENTS

| | | |
|---|---|---|
| WO | WO 99/31636 | 6/1999 |
| WO | WO 01/24127 | 4/2001 |

* cited by examiner

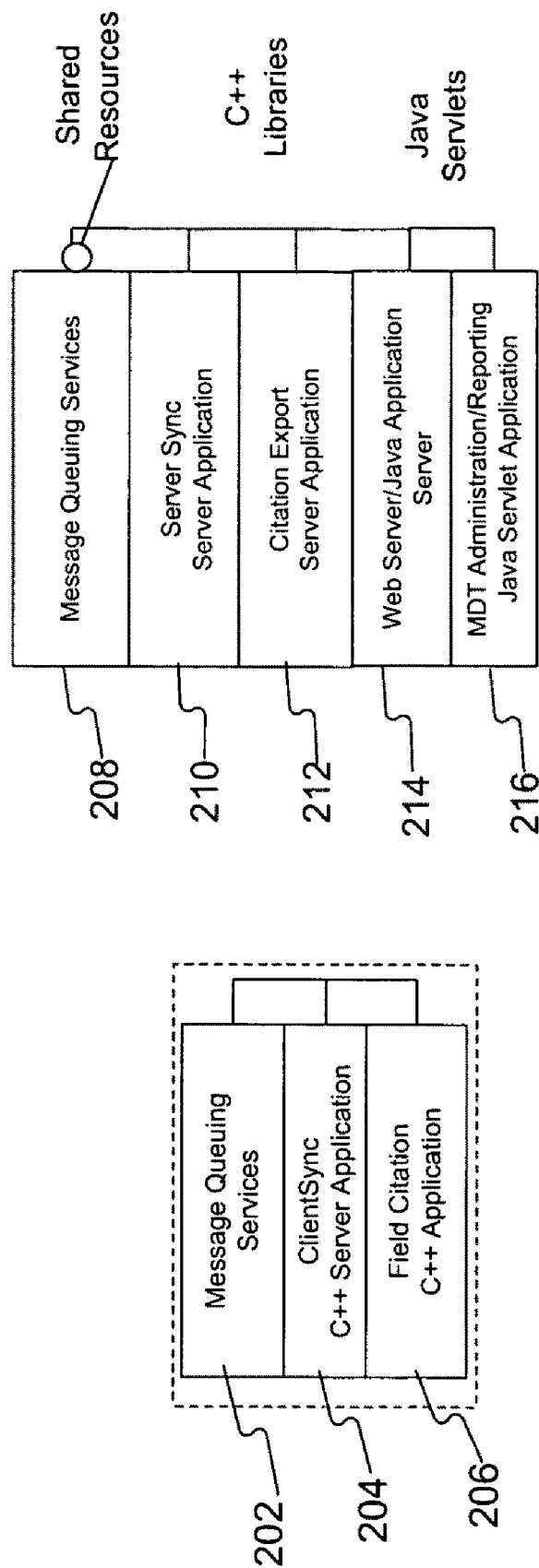

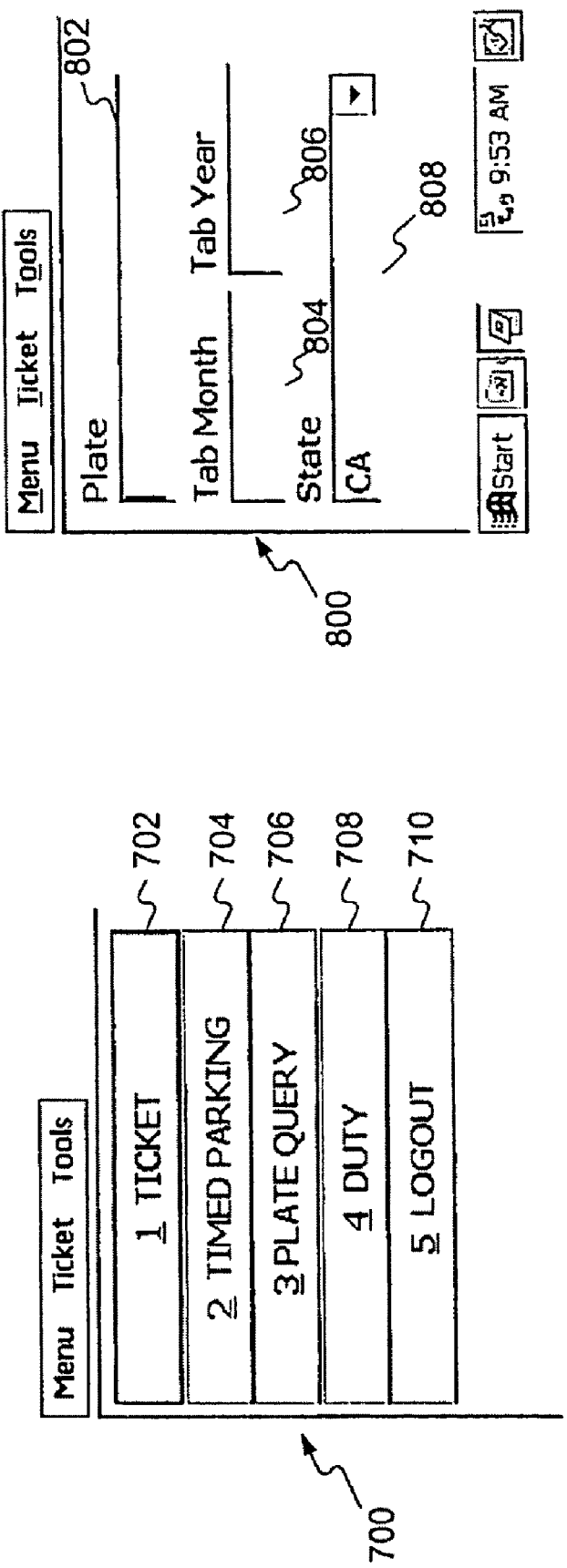

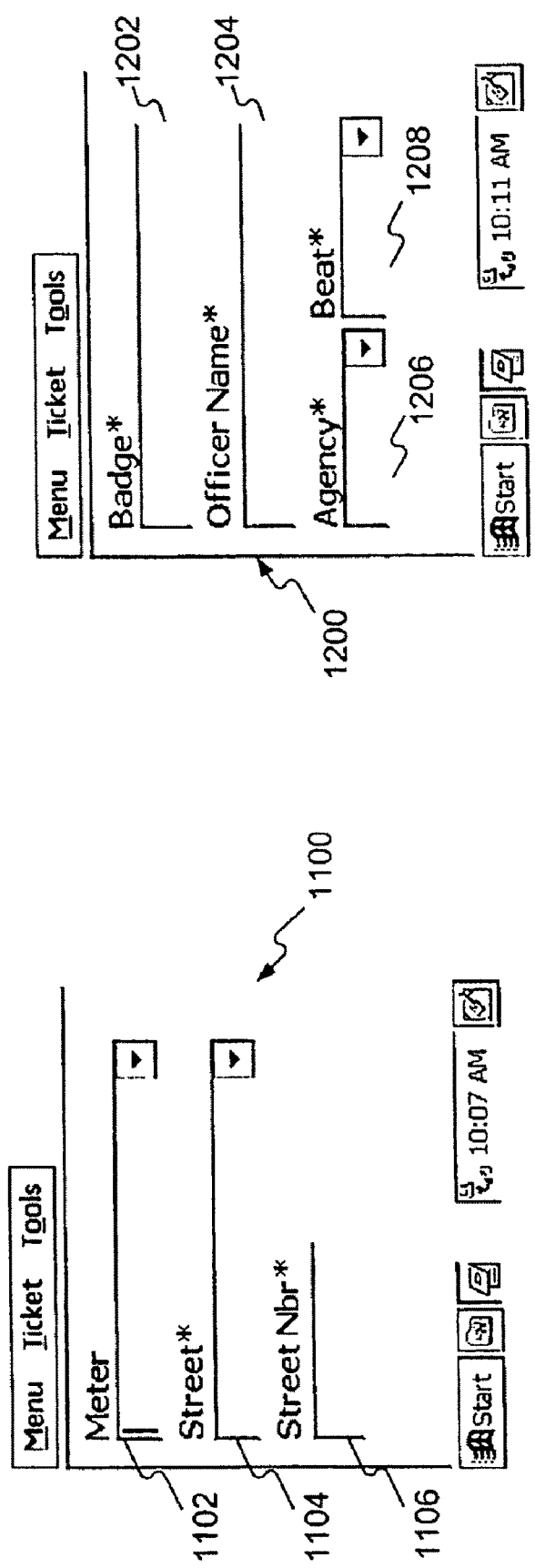

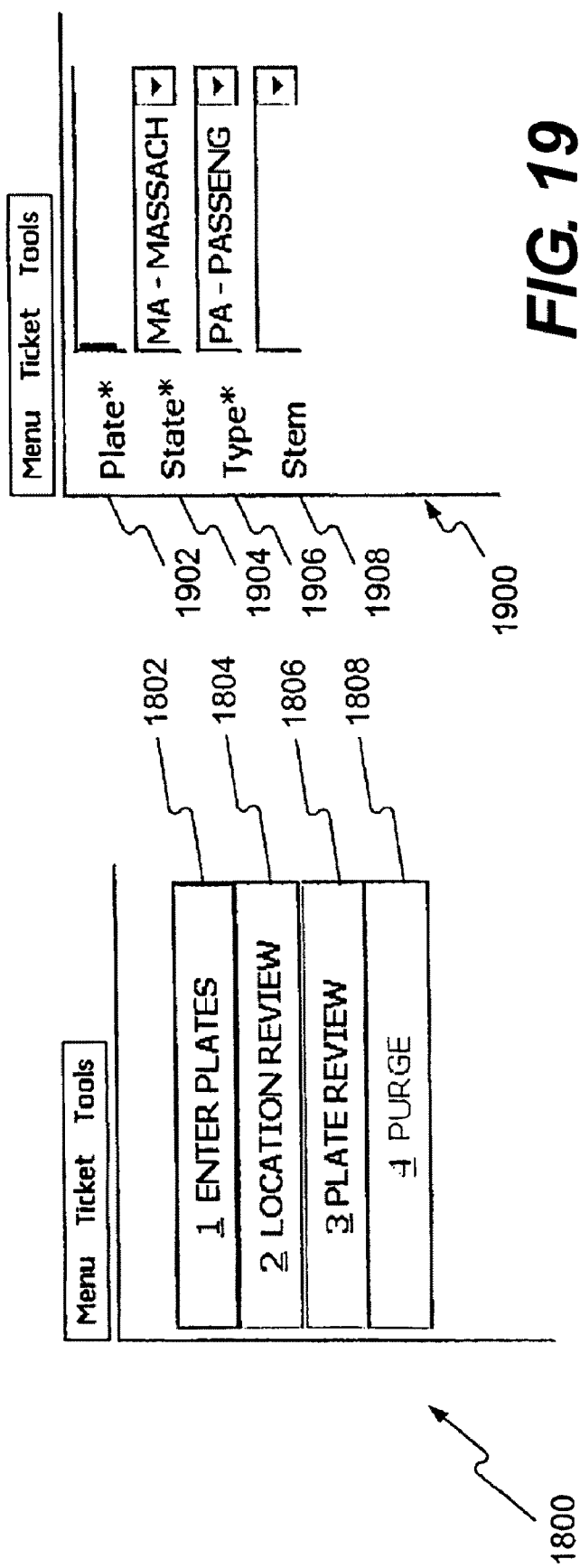

| Plate | Remaini... | St. |
|-------|-----------|-----|
| ABC8  | Expired   | MA  |
| ABC9  | Expired   | MA  |
| ABC10 | Expired   | MA  |
| ABC123| 00:58     | MA  |
| BB990 | 00:58     | MA  |

Menu Ticket Tools

1-Issue, 2-Add, 3-Expired, D-Remove. ENTER-Detail

*FIG. 23*

Menu Ticket Tools
Enter Data    OK

Select Plate

ABC123
BAC234

*FIG. 22*

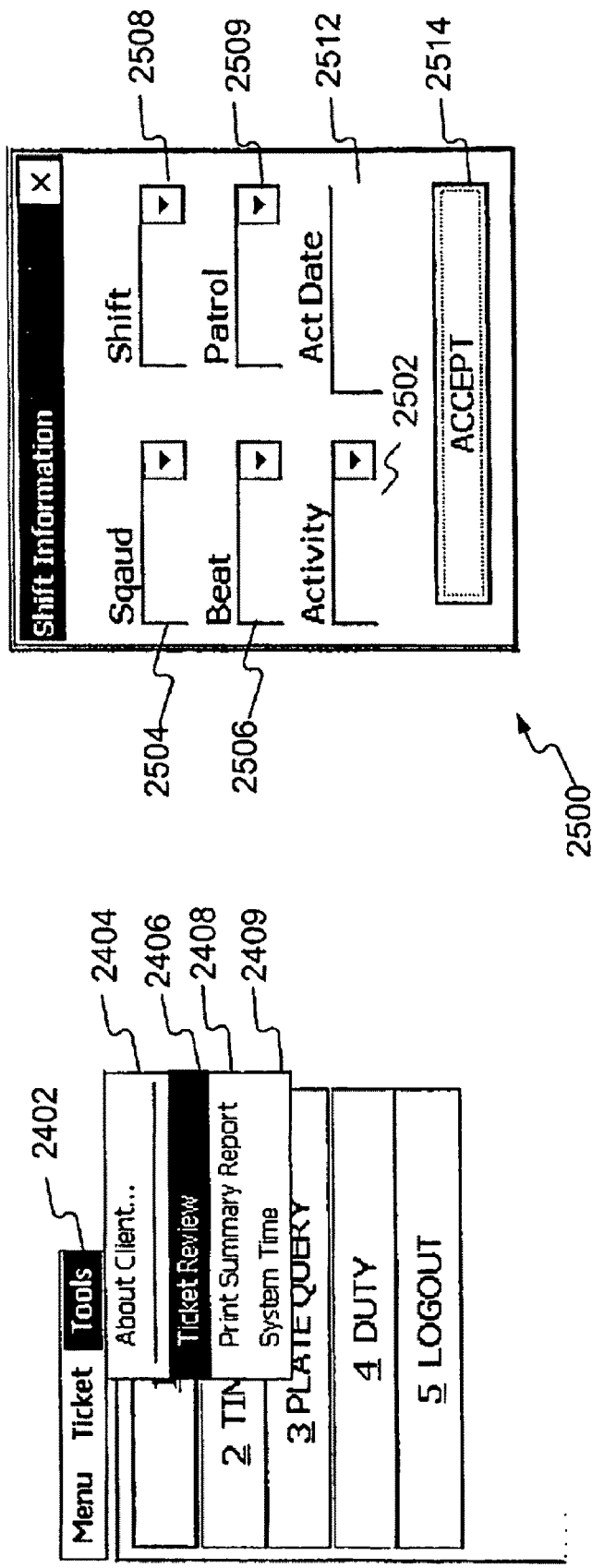

FIG. 37

PEO ADMINISTRATION - INTERNET EXPLORER
FILE  EDIT  VIEW  FAVORITES  TOOLS  HELP
SEARCH  FAVORITES  MEDIA
http://scofflaw.ims.imco.com/Parking/Administration

PEO VIOLATION ADMINISTRATION

SELECT CHARGE CODE OR CHARGE DESCRIPTION TO INQUIRE ON VIOLATION INFORMATION THEN PRESS SUBMIT BUTTON,
FOR NEW ENTRY ENTER DATA THEN PRESS ADD BUTTON TO PROCESS REQUEST.

↩ RETURN TO MAIN MENU  3704

VIOLATION CODE: [▼] DESCRIPTION: [  ] [SUBMIT] TOTAL VIOLATIONS: 324
                 3702                      3706

VIOLATION INFORMATION
CHARGE CODE: [▼] DESCRIPTION: [  ] CATEGORY: [▼]
              3708                3710        3712   3716
                                  3714 ACTIVE DATE: [  ]

PENALTY INFORMATION
FINE AMOUNT: [  ]  ADDITIONAL AMOUNT: [  ] (VALUE CALCULATED)
             3718
TOTAL DUE: [  ]
3720

[ADD]  [RESET]  3722

○ INTERNET

3700

PEO ADMINISTRATION - INTERNET EXPLORER
FILE  EDIT  VIEW  FAVORITES  TOOLS  HELP
○ SEARCH  □ FAVORITES  ○ MEDIA
http://scofflaw.ims.imco.com/Parking/Administration PEO VIOLATION ADMINISTRATION
MODIFY VIOLATION INFORMATION ENTRY,
THEN PRESS SUBMIT BUTTON TO PROCESS REQUEST.
→ RETURN TO MAIN MENU VIOLATION INFORMATION
CHARGE CODE: 1044025 — 3708   DESCRIPTION: PARKED ON LAWN — 3712   CATEGORY: T — 3710
ACTIVE DATE: 01/01/1993

PENALTY INFORMATION
FINE AMOUNT: 30.00 — 3714   ADDITIONAL AMOUNT: ____ — 3716
TOTAL DUE: 30.00  (VALUE CALCULATED)

[MODIFY]  [RESET]  [DELETE]
  3802     3804     3806

○ INTERNET

| HANDHELD ID | FILE | FILE DATE | LAST UPDATE | VERIFIED |
|---|---|---|---|---|
| 3ADC7E9BEF0D0098 | Flash Disk\Data\TicketControl_1.XML | 06/09/2003 01:02:07PM | 06/09/2003 01:02:08PM | YES |
| 3ADC7E9BEF0D0098 | Flash Disk\Data\TicketControl_2.XML | 06/09/2003 01:07:54PM | 06/09/2003 01:07:55PM | YES |
| 3ADC7E9BEF0D0098 | Flash Disk\Data\Agency.TABLE.XML | 06/05/2003 05:27:46PM | 06/11/2003 10:24:34AM | YES |
| 3ADC7E9BEF0D0098 | Flash Disk\Data\COLOR.TABLE.XML | 05/28/2003 11:22:12AM | 06/02/2003 02:26:42PM | YES |
| 3ADC7E9BEF0D0098 | Flash Disk\Data\DUTYSTATUS.TABLE.XML | 05/28/2003 11:58:25AM | 06/02/2003 02:26:42PM | YES |
| 3ADC7E9BEF0D0098 | Flash Disk\Data\EQUIPMENT.TABLE.XML | 06/18/2003 11:57:20AM | 06/18/2003 2:27:00PM | YES |
| 3ADC7E9BEF0D0098 | Flash Disk\Data\HANDHELD.TABLE.XML | 06/17/2003 05:19:24PM | 06/18/2003 02:27:00PM | YES |
| 3ADC7E9BEF0D0098 | Flash Disk\Data\Meters.TABLE.XML | 05/27/2003 11:14:28PM | 06/02/2003 02:26:42PM | YES |
| 3ADC7E9BEF0D0098 | Flash Disk\Data\PROPERTY.TABLE.XML | 06/05/2003 05:28:53PM | 06/11/2003 10:24:35AM | YES |
| 3ADC7E9BEF0D0098 | Flash Disk\Data\REASONFORVOID.TABLE.XML | 05/23/2003 04:55:02PM | 06/02/2003 02:26:42PM | YES |

FIG. 46

PEO ADMINISTRATION - INTERNET EXPLORER
FILE  EDIT  VIEW  FAVORITES  TOOLS  HELP
◯ SEARCH ☐ FAVORITES ☐ MEDIA ◯ ☐ ▽ ☐
http://scoflaw.ims.imco.com/Parking/Administration

↩ BACK

| SELECTION CRITERIA | | |
|---|---|---|
| FROM DATE & TIME: | 07/07/2003 | 00:00:00 |
| TO DATE & TIME: | 07/07/2003 | 23:59:00 |

TOTAL TRANSACTIONS: 0

| ACTIVE HANDHELDS | UPLOADS | ERRORS | TOTAL |
|---|---|---|---|
| NON ACTIVE HANDHELDS | UPLOADS | ERRORS | TOTAL |
| MS00352 | 0 | 0 | 0 |
| MS00356 | 0 | 0 | 0 |
| MS00336 | 0 | 0 | 0 |
| MS00366 | 0 | 0 | 0 |
| LASH99 | 0 | 0 | 0 |
| MS00169 | 0 | 0 | 0 |
| MS00292 | 0 | 0 | 0 |
| LASH98 | 0 | 0 | 0 |
| MS00317 | 0 | 0 | 0 |

◯ INTERNET

| TRANSACTION NUMBER | TRANSACTION STATUS | TIME OF OCCURRENCE |
|---|---|---|
| SO60054271 | ORA-29532: JAVA CALL TERMINATED BY UNCAUGHT JAVA EXCEPTION: oracle.xml.sql. OracleXMLSQLException: Exception oracle.jdbc.driver.OracleSQLException:ORA-01401: INSERTED VALUE TOO LARGE FOR COLUMN ENCOUNTERED DURING PROCESSING ROW ELEMENT 1All PRIOR XML ROW CHANGES WERE ROLLED BACK IN THE XML DOCUMENT. | 01/24/2003 11:04:50AM |
| SO60054256 | ORA-29532: JAVA CALL TERMINATED BY UNCAUGHT JAVA EXCEPTION: oracle.xml.sql. OracleXMLSQLException: Exception oracle.jdbc.driver.OracleSQLException:ORA-01401: INSERTED VALUE TOO LARGE FOR COLUMN ENCOUNTERED DURING PROCESSING ROW ELEMENT 1All PRIOR XML ROW CHANGES WERE ROLLED BACK IN THE XML DOCUMENT. | 01/24/2003 11:04:48AM |
| SO60054142 | ORA-29532: JAVA CALL TERMINATED BY UNCAUGHT JAVA EXCEPTION: oracle.xml.sql. OracleXMLSQLException: INVALID CHAR IN TEXT. | 01/24/2003 11:04:33AM |

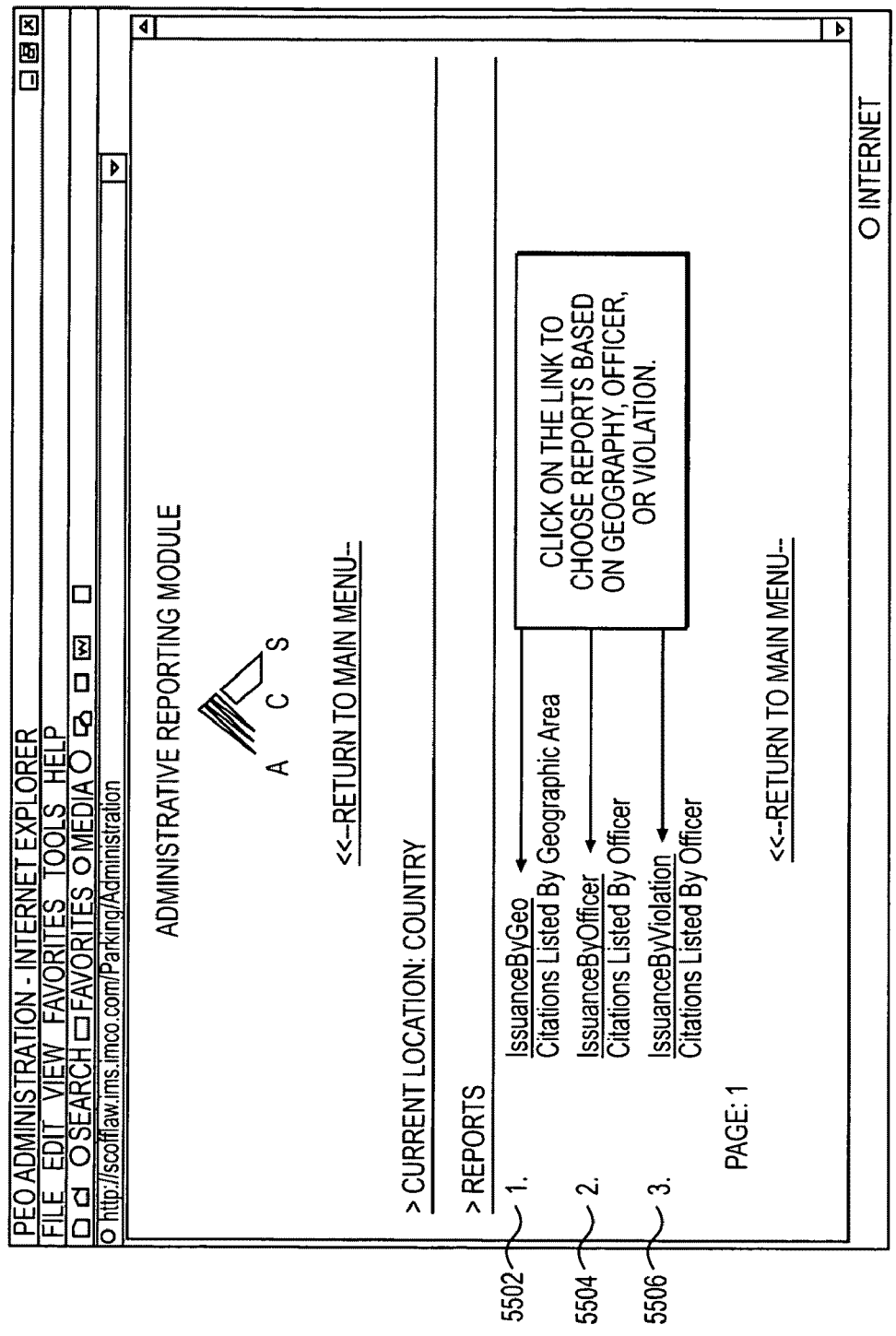

ISSUANCE
- CLIENTCODE: CHAR(2)
- TICKETNUMBER:CHAR(11)
- TYPE_:CHAR(0)
- SESSIONID: VARCHAR2(255)
- TICKETSTATUS: CHAR(10)
- BATCHDATE: DATE
- CLERKID: CHAR(10)
- HANDHELDID: VARCHAR2(50)
- VIOLATIONCODE: VARCHAR2(20)
- STREETNAME: VARCHAR2(25)
- STREETNUMBER: VARCHAR2(10)
- QUADRANT: CHAR(2)
- SIDE: CHAR(1)
- TICKETLOCATION: CHAR(25)
- ROUTE: CHAR(5)
- METERID: CHAR(10)
- FINEAMOUNT: CHAR(1)
- VIOLATIONDESCRIPTION: VARCHAR2(25)
- ISSUEDATETIME: DATE
- BADGENUMBER: CHAR(5)
- OFFICERNAME: VARCHAR2(50)
- STATIONADDRESS:VARCHAR2(50)
- ISSUEAGENCY: CHAR(2)
- LICENSEPLATE:VARCHAR2(8)
- LICENSEPLATE: CHAR(2)
- PLATETYPE: CHAR(1)
- PLATEYEAR: CHAR(1)
- PLATEMONTH: CHAR(2)
- PLATECOLOR: CHAR(1)
- VEHICLEMAKE: CHAR(5)
- VEHICLECOLOR: CHAR(2)
- VEHICLEIDENTIFICATIONNBR: VARCHAR2(25)
- VEHICLESTYLE:CHAR(2)
- VEHICLETYPE: CHAR(1)
- OFFICERSIGNATUREFILE: VARCHAR2(255)
- ASSIGNEDAGENCY: CHAR(3)
- ASSIGNEDDATETIME: DATE
- PKACCIDENT: CHAR(1)
- PKHAZARD: CHAR(1)
- DIVISION: CHAR (2)
- DRIVERSLIC: VARCHAR2(22)
- DESCRIPTOR: VARCHAR2(2)

COMMENTS
- CLIENTCODE: CHAR(2)
- TICKETNUMBER: CHAR(11)
- RECID: VARCHAR2(11)
- TYPE_: CHAR(3)
- COMMENT_: VARCHAR2(81)
- BATCHDATE: DATE
- COMMENTSTATUS: VARCHAR2(10)

IMAGE
- IMAGENAME: VARCHAR2(255)
- IMAGEDATA: BLOB(4000)

SYSTEMEVENTS
- CLIENTCODE: CHAR(2)
- TICKETNUMBER: CHAR(11)
- TYPE_: CHAR(3)
- EVENTNAME: VARCHAR2(50)
- EVENTPRIORITY: VARCHAR2(50)
- EVENTSOURCE: VARCHAR2(50)
- EVENTDESC: VARCHAR2(1021)
- EVENTTIME: DATE
- EVENTREMOTESOURCE: VARCHAR(50)
- REFERENCE: VARCHAR2(50)
- ID: NUMBER(8)

MULTIPLE CLIENT FIELD DEVICE DATA ACQUISITION AND STORAGE

This is a division of application Ser. No. 10/835,923, filed Apr. 30, 2004, now U.S. Pat. No. 7,617,120 which under the provisions of 35 U.S.C. §119(e) claims the benefit of priority of U.S. Provisional Application No. 60/467,096, filed Apr. 30, 2003, both of which are incorporated herein by reference in their entirety.

TECHNICAL FIELD

The invention relates to the field of data acquisition; and more particularly, a system for and method of entering, storing, retrieving, extracting and maintaining vehicle citation and employee activity data, and providing reporting functions based on the stored acquired data.

BACKGROUND

Currently, most municipalities in a region operate vehicle parking and traffic violation systems using local computer networks. This means that each municipality must make a capitol investment in equipment and expend a portion of its budget to pay for supervisory personnel to operate and manage the local network.

In these local networks, parking officers gather the citation information using handheld devices, and the captured information is uploaded to the local network. Using this approach, the citation information gathered and stored from the various municipalities remains de-centralized. Each municipality attempts to manage its own information. This is an inefficient method to manage the captured citation information in a region.

Furthermore, using local networks, it is difficult to track the status of the citation information and export information to other external information systems, which the municipality or agency may use for other information management or revenue generating purposes.

The present invention is directed to overcome one or more of the above problems and achieving one or more of the above stated goals.

SUMMARY

In accordance with the principles of the present invention, a system is provided for acquiring and storing field information, comprising a plurality of field devices operable to gather field information and receive updated file information; a cradle comprised of a socket to mechanically and electrically connect to the field devices and a communication circuit for transmitting and receiving field and file information; a network coupled to the communication circuit for receiving the field information from the field devices, and transferring the updated file information to field devices connected to the cradle; and a server operable to receive the field information from the network, store the field information in data tables assigned to at least one client, and transmit updated field information to the network.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 2a is an illustration of exemplary software applications that may operate on field devices consistent with the principles of the present invention.

FIG. 2b is an illustration of exemplary software applications that may operate on the central processing server consistent with the principles of the present invention.

FIG. 7 is an illustration of an exemplary main menu screen consistent with the principles of the present invention.

FIG. 8 is an illustration of an exemplary vehicle entry screen consistent with the principles of the present invention.

FIG. 11 is an illustration of an exemplary location entry screen consistent with the principles of the present invention.

FIG. 12 is an illustration of an exemplary officer entry screen consistent with the principles of the present invention.

FIG. 18 is an illustration of an exemplary timed parking screen consistent with the principles of the present invention.

FIG. 19 is an illustration of an exemplary plate information entry screen consistent with the present invention.

FIG. 22 is an illustration of an exemplary timed parking plate selection screen consistent with the present invention.

FIG. 23 is an illustration of an exemplary timed parking list generated based on the plate criteria, consistent with the present invention.

FIG. 24 is an illustration of exemplary functions that may be provided by the "tools" menu, consistent with the present invention.

FIG. 25 is an illustration of an exemplary shift information screen consistent with the principles of the present invention.

FIG. 37 is an illustration of an exemplary violation administration screen consistent with the principles of the present invention.

FIG. 38 is an illustration of an exemplary violation screen consistent with the principles of the present invention.

FIG. 40 is an illustration of an exemplary general equipment administration screen consistent with principles of the present invention.

FIG. 41 is an illustration of an exemplary handheld administration screen consistent with the principles of the present invention.

FIG. 46 is an illustration of an exemplary screen for displaying the current files on each handheld, consistent with the principles of the present invention.

FIG. 52 is an illustration of an exemplary additional report screen consistent with the principles of the present invention.

FIG. 54 is an illustration of an exemplary transaction summary screen consistent with the principles of the present invention.

FIG. 55 is an illustration of an exemplary administrative report module screen consistent with the principles of the present invention.

FIG. 59 is a layout of exemplary citation data structures consistent with the principles of the present invention.

DETAILED DESCRIPTION

Figure 1:
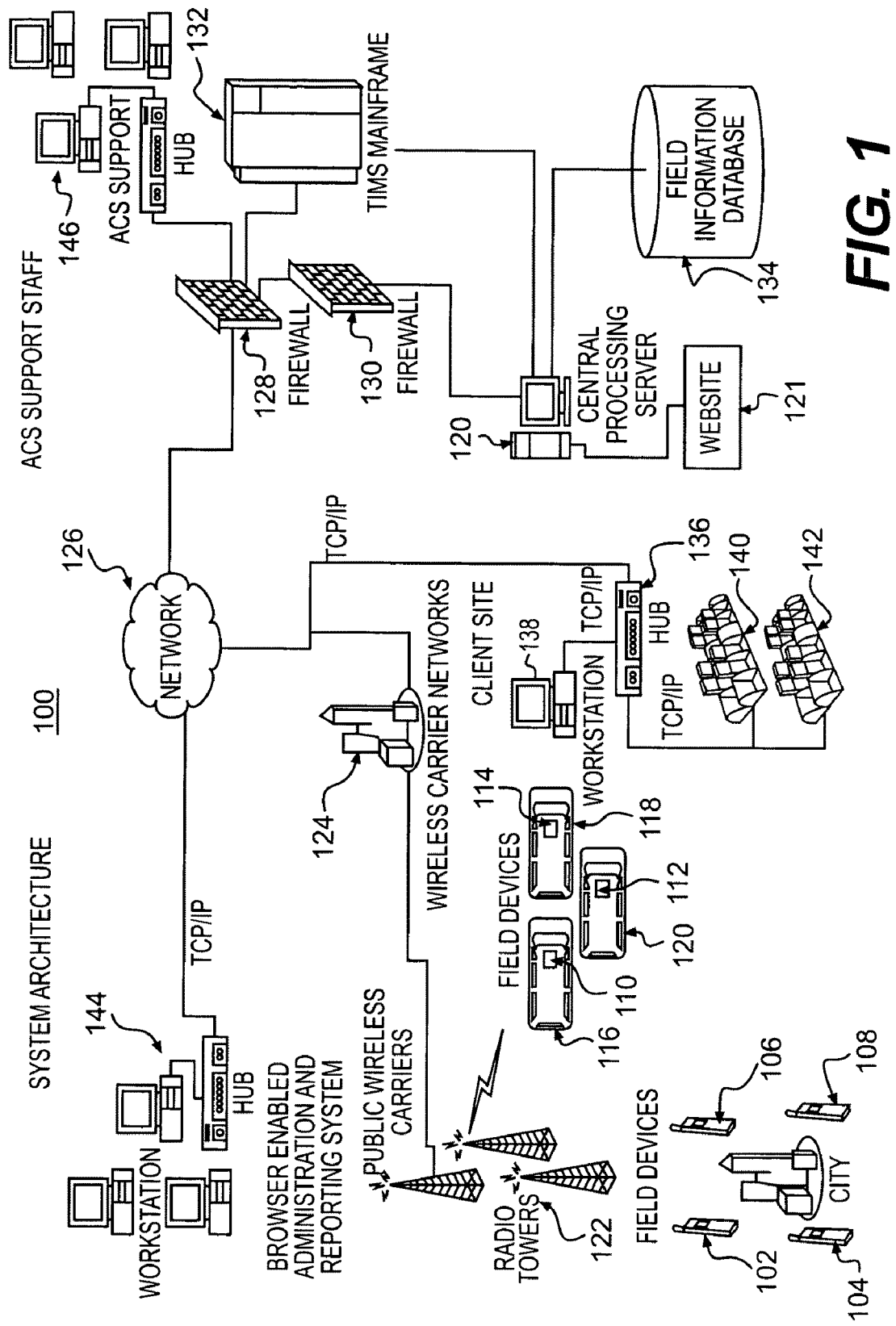
FIG. 1 is an illustration of an exemplary system architecture consistent with the principles of the present invention.

Reference will now be made in detail to the exemplary embodiments of the invention, examples of which are illustrated in the accompanying drawings. Wherever possible, the same reference numbers will be used throughout the drawings to refer to the same or like parts.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Consistent with the principles of the present invention, a centralized citation ("ticket") issuance system may be "hosted" by a remote server located at a data processing center. In one embodiment, through a nationwide private, secure network, ethernet-capable handheld cradles may be installed at parking authorities throughout the country. This architecture may enable municipalities to implement handheld ticketing technology in relatively short order at a much lower cost than traditional systems.

This type of centralized system may securely manage one municipality's data separately from all the others. The design of the system may also give municipalities the flexibility to further segment their ticket and personnel data to sub locations (e.g., divisions, districts, zones, etc.). This may be accomplished by the database having the primary key as the client/municipality code, along with an additional index for a location value. The database tables may be built with the client key and location indexes, meaning that the information may be grouped or separated by the main account (e.g., municipality). Then, the data may be either shared or separated across multiple locations. The architecture of the system may comprise a database that may be configured to accommodate unique requirements for individual customers within the common architecture and design.

Achieving a centralized design may revolve around the database design, in which aspects of the individual client may be defined within the tables of the database. The client and location tables may define the actual locations, which may be associated with the personnel, equipment, code tables, violation codes and fines, and the tickets.

Consistent with the principles of the present invention, handheld data communication devices ("handhelds") may be configured to a specific location within a single client/municipality. Upon returning a handheld to a cradle, communication with the centralized server may be established. The handheld/cradle system may upload any ticket information created on the handheld, and then may determine if the handheld requires additional ticket numbers for future ticketing. If additional tickets are required, the server process may retrieve the next ticket number allotment and distribute them to the handheld.

Data verification between handhelds and the server may involve data that has been added or modified on the server since the last cradling instance of a handheld. The appropriate data may be queued and then delivered to the handheld; then if the data is accepted by the handheld, the handheld may in turn deliver an acknowledgement back to the sever for each file received. The entire process may be logged within the system, allowing for user access and analysis through a web enabled administrative website.

The above mentioned system may provide the benefits of reducing or eliminating data errors, enforcing greater consistency in parking citation business processes, improving timeliness of information, increasing productivity of transit enforcement officers (TEOs), supervisory personnel, and office staff, and increasing the level of communications between operational personnel.

FIG. 1 provides an illustration of an exemplary system architecture 100 consistent with the principles of the present invention. In system architecture 100, clients may utilize field devices to gather field data. A client may be a municipality, agency, municipality, or any other organization.

In one embodiment consistent with the principles of the present invention, system 100 includes field devices which may be handheld devices (102-108) and/or laptops (110-114) installed in vehicles (116-120), or any other type of computing device. The data gathered with the field devices may be, for example, citation information, vehicle tracking information, out of state vehicle information, logging information, officer activity information, or any other type of field information, which is then processed by software applications executing on the field devices.

Once the field data is gathered, the field data may be uploaded to a central processing server 120 using one or more data transmission means. In one embodiment consistent with the present invention, the field data may be gathered through wireless communications. Handheld devices (102-108) and/or laptops (110-114) transmit the field data, using wireless communication protocols, to radio towers 122. The radio towers (122), in turn, transmit the field data to wireless carrier networks (124) for transmission to network 126. Network 126 may comprise, alone or in any suitable combination, a telephone-based network, a local area network (LAN), a wide area network (WAN), a dedicated intranet, and/or the Internet.

Through network 126, the field data may be transmitted through firewalls (128 and 130) to central processing server 120 for storage in a field information database 134. Database 134 may store the information for various clients and may be an Oracle database, or any other appropriate type of data storage means.

In another embodiment consistent with the present invention, the field devices, or any other type of computing device that can communicate via the Transmission Control Protocol/Internet Protocol (TCP/IP), may be physically connected to hub 136 for wired communications to central processing server 120.

In this embodiment, if the field devices are handheld devices (102-108), after the field data is gathered, handheld devices (102-108) may be placed in cradles (140 and 142), thereby transferring the gathered field data to hub 136 for transmission to network 126. Otherwise, if the field devices are laptops (110-114), the laptops may be connected to hub 136 for the field information to be transferred to network 126.

Once network 126 receives the field information, network 126 transfers the field information through firewalls (128 and 130) to central processing server 120 for storage in field information database 134. The data transmission between cradles (140 and 142) and hub 136, between hub 136 and network 126, and between network 126 and central processing server 120 may be via TCP/IP connections; but are not limited to such connections, since any other appropriate data transmission protocol may be used.

As part of the upload process, central processing server 120 may check storage devices (not shown) and download new versions of files that the field devices may be configured to receive. Based on the type of application running on the field devices and the server, central processing server 120 retrieves and downloads new versions of files to the field devices. The new version files may be code tables and/or program file updates. Central processing server 120 may perform the following functions: verify that the downloaded files have been received by the field devices; log data transfers; store version information on the files that are stored in the field devices; and store detailed statistics regarding information that is uploaded from the field devices, such as the number of citations issued by a particular field application.

In one embodiment consistent with the principles of the present invention, central processing server 120 synchronizes the clocks in the various field devices, based on the associated time zones. Central processing server 120 may also be configured to import/export data to and from external information systems, such as a Ticket Information Management System (TIMS) mainframe 132.

In addition to the above functionality, central processing server 120 may also host a website 121 through which a work station 138, a browser-enabled administration and reporting system 144, and a support staff system 146 may monitor and manage the information gathered through the field devices. Below, in conjunction with one embodiment consistent with the principles of the present invention, exemplary information managing and monitoring functions will be described.

FIG. 2a illustrates the software applications that may operate on handheld devices (102-108) and laptops (110-114). In the wireless embodiment described above, a message queuing services application 202 may operate on the field devices (e.g., handheld devices (102-108) and laptops (110-114)) to transfer data from the field devices to a message queuing services application 208 at central server processing server 120 (FIG. 2b). Message queuing services application 202 confirms and manages the data transmitted from the field devices to central server processing server 120. Message queuing services application 202 and 208 may be implemented via third party or custom message queuing services, such as Broadbeam ExpressQ messaging system (for wireless networks), Microsoft Message Queue, and IBM Mqueue.

In the embodiment in which the field devices are connected to hub 136, a clientsync server application 204 may operate on the field devices and laptops. Upon insertion of handheld devices (102-108) into cradles (140 and 142), or connection of laptops (110-112) to hub 136, bilateral communications may be maintained with a server sync server application 210 (FIG. 2b). The bilateral communications transfer data between the field devices and central processing server 120 may be accomplished via the TCP/IP protocol.

A field citation application (FCA) 206 may operate on the field devices to allow a user to issue, store, and print field information (e.g., parking citation information or vehicle tracking information). An embodiment of field citation application 206, consistent with the principles of the present invention, will be described below.

FIG. 2*b* illustrates software applications that may operate on central processing server 120. In the wireless embodiment described above, message queuing services 208 may be used to transmit responses to the data transfers from message queuing services 202, operating in the field devices. In the embodiment in which the field devices are connected to hub 136, server sync server application 210 may receive field information from clientsync server application 204 and may transmit update file information to clientsync server application 204. The received field information is stored in field information database 134.

A citation export server application 212 initiates a process which gathers and formats the field information marked "New," and exports the field information to external information systems. A web server/Java application 214 hosts an administrative website through which browser-enabled administration and reporting system 144, work station 138, and support staff system 146 may monitor and manage field information. An administrative/reporting Java servlet application 216 may enable the querying of field information and the generation of field information reports.

Communications between field devices (102-114) and central processing server 120 may contain the following information: client name (message source or destination); description (optional text); request type (numeric value associated with the supported message types); payload length (length in bytes of the raw data payload); payload (message data, usually contents of a file being transferred). Table 1 below provides exemplary requests and responses that may be supported by communications between field devices and central processing server 120.

In one embodiment consistent with the principles of the present invention, FCA 206 enables a user (e.g., a parking enforcement officer) to issue, store, and print parking citations. FCA 206 also provides an Officer Management System (OMS) and abandoned vehicle functions. The OMS function provides a means of capturing various shift details pertaining to user productivity.

In this embodiment, users utilize handheld devices (102-108) to issue parking citations and perform other parking enforcement-related tasks, such as timed parking. The description below will provide the details of the citation issuance process and the timed parking task.

Figure 4:
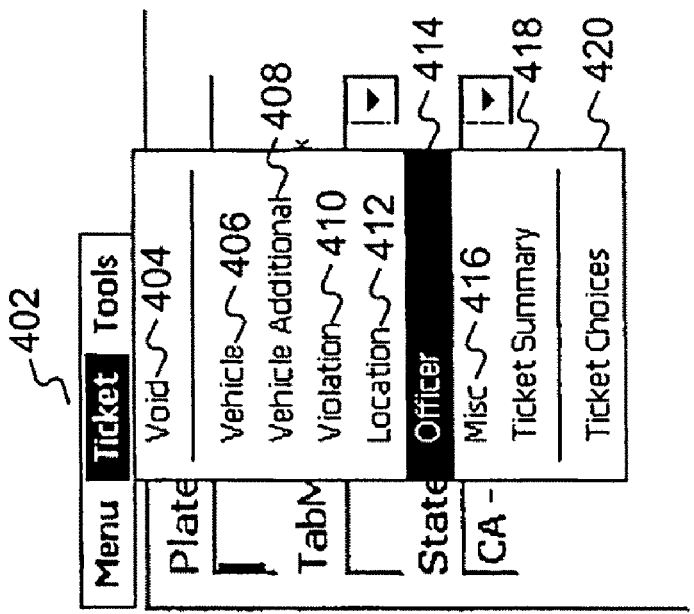
FIG. 4 is an illustration of an exemplary program "ticket" item consistent with the principles of the present invention.
Figure 3:
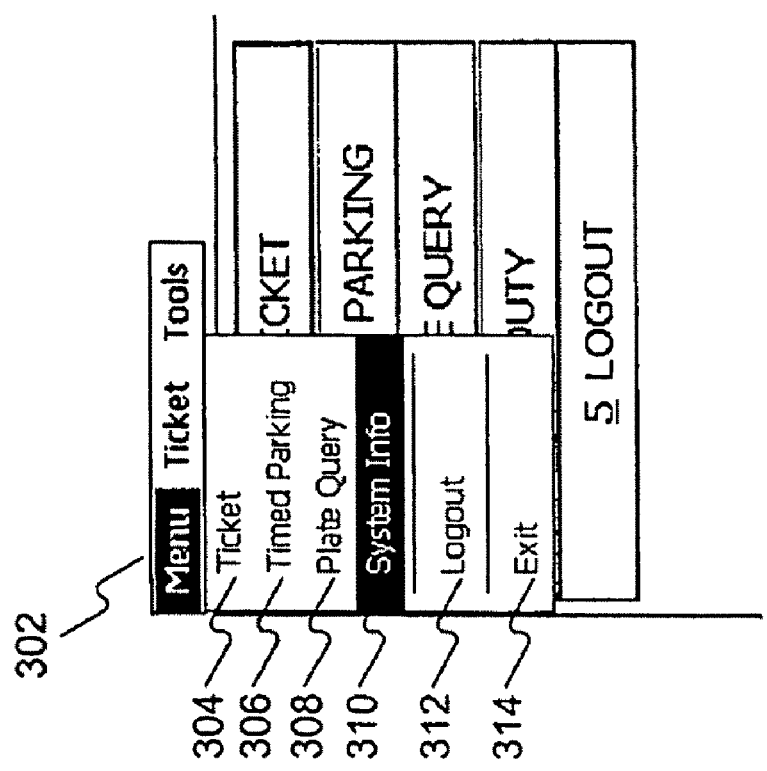
FIG. 3 is an illustration of an exemplary program "menu" item consistent with the principles of the present invention.
Figures 5, 6:
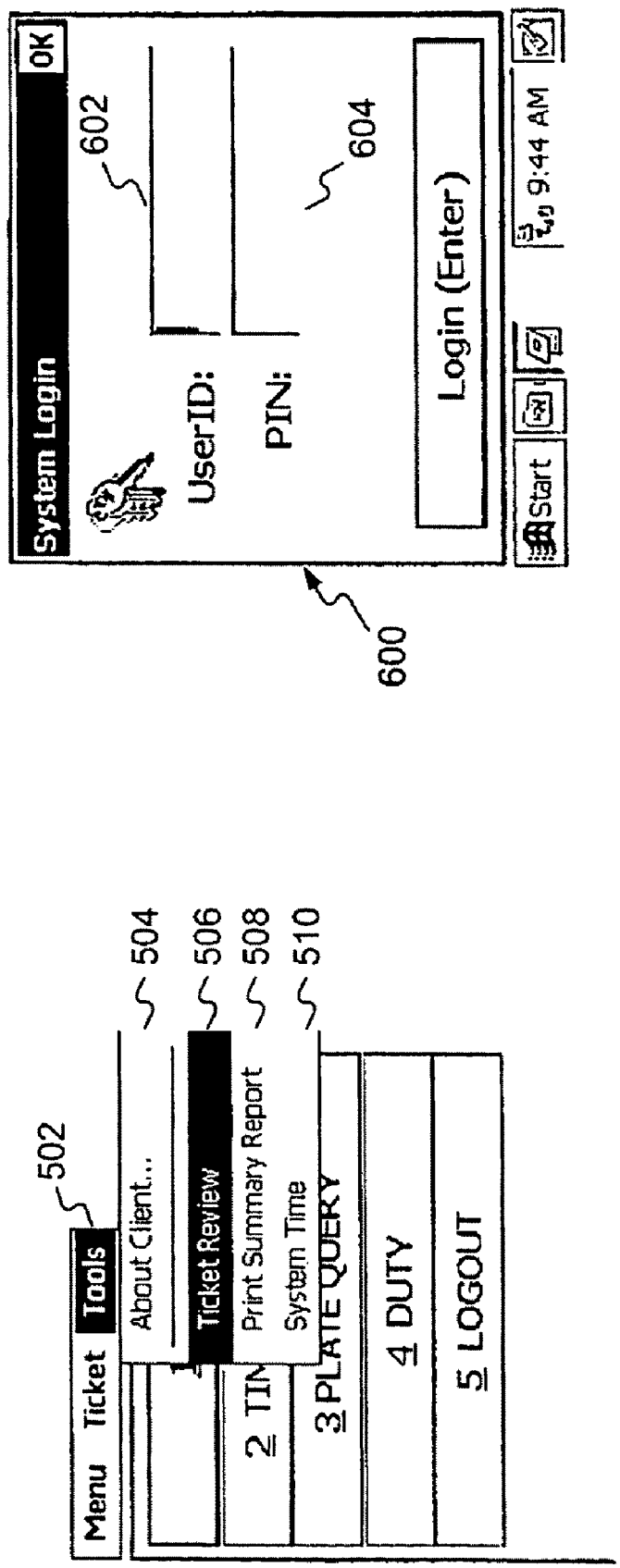
FIG. 5 is an illustration of an exemplary program "tools" item consistent with the principles of the present invention.
FIG. 6 is an illustration of an exemplary user login screen consistent with the principles of the present invention.

FIGS. 3-5 provide an illustration of exemplary windows-style program menus that may be utilized with handheld devices (102-108) to perform the parking enforcement related tasks. FIG. 3 illustrates the menu items that may be included in a "menu" tab 302. "Menu" tab 302 provides the user with access to the main program functionality. A "ticket" entry 304 allows the user to enter the ticket entry mode; a "timed parking" entry 306 allows the user to track and time vehicles in timed parking zones; a "plate query" entry 308 allows the user to query the system for stolen or scofflaw vehicles; a "system info" entry 310 displays information about the system such as battery level, number of tickets issued, etc.; and a "logout" entry 312 and "exit" entry 314 both end the current user session.

FIG. 4 illustrates the menu items that may be included in a "ticket" tab 402. "Ticket" tab 402 may be available during ticket entry mode and allows the user to navigate the various ticket entry screens. For example, a "void" entry 404 may allow the user to void the current parking enforcement task; a "vehicle" entry 406 may allow the user to enter the vehicle identification information (e.g., VIN number and/or plate); a "vehicle additional" entry 408 may allow the user to enter

TABLE 1

1. System Time Request: message sent by field device to request the current system time from the central processing server.
2. System Time Response: a response to a 'system time request' consisting of the current central processing server system time. The field device uses this response to synchronize its clock with the central processing server time.
3. File: message consists of the contents of a file. The field device can send this message type to the central processing server (file upload) or from the central processing server to the field device (file download). Files uploaded from field device to central processing server are stored in the 'uploads' subdirectory. Files sent from the central processing server to field device are saved to the location (on the field device) specified in the message.
4. File Acknowledgement: sent by either the field device or the central processing server in response to a successfully received 'file' message. The acknowledgment is sent when the file message has been written to the local disk of the recipient.
5. Custom Request: sent by the field device to request custom processing on files which have been uploaded to the central processing server. This 'custom processing' is implemented on the central processing server side to perform application specific logic. In the case of ticketing, this request triggers the server to import uploaded files into a ticketing database.
6. Custom Response: sent by the central processing server to trigger custom processing on the field device. This 'custom processing' is implemented on the field device side to perform application specific logic. In the case of ticketing, this request may not be required and used.
7. Basic Complete: sent by the central processing server to indicate that uploads and custom processing is complete. This message is used to notify the field device that the central processing server is ready for a 'file request.'
8. File Request: sent by the client to request any new files located in the server 'ftp folder'. The server responds to this request by scanning the 'ftp folder' for any files that are new or have changed since the last download to the requesting device. If any new files are found, they are sent to the field device in the form of a 'file' message.
9. Complete: sent by the central processing server to the field device to indicate that there are no more messages or files for the field device. This signals the end of the communication process.

additional vehicle identification information (e.g., the make, color, type of vehicle, etc.); a "violation" entry 410 may allow the user to enter the ticket information details; a "location" entry 412 may allow the user to enter the vehicle and/or the meter location information; an "officer" entry 404 may allow the user to enter parking enforcement officer (PEO) information (e.g., badge, officer name, and agency name); a "misc" entry 416 may allow the user to execute other miscellaneous tasks associated with ticket entry; a "ticket summary" entry 418 may allow the user to view the details of the current ticket; and a "ticket choices" entry 420 may allow the user to enter external and internal comments, view ticket summary information, void tickets, generate quick tickets, and print the current ticket.

FIG. 5 illustrates exemplary menu items that may be included in a "tools" tab 502. For example, an "about the client" entry 504 displays the program version and copyright; a "ticket review" entry 506 allows the user to review and re-print previously issued tickets; a "print summary report" entry 508 allows the user to print a summary report which shows the total number of tickets issued for the shift; and a "system time" entry 510 displays the current time according to the system clock.

FIG. 6 provides an illustration of an exemplary user login screen 600, which may be displayed on handheld devices (102-108) and/or laptops (110-114). Upon start of a shift, the user may be required to login to the field citation application to start a parking enforcement session. The user may be prompted to enter information in a UserID (e.g., Badge Number) field 602 and a PIN field 604. After entering UserID and PIN information, FCA 206 may verify that the information is valid. This verification may be accomplished by finding a match in a local "users" file (not shown).

FCA 206 may support the use of UserIDs which may be used for training. When a user logs on with a UserID, which has been designated for training, all user functions may be available. One of the differences of this mode of operation may be that the citations are flagged as "training," so they are not processed by TIMS mainframe 132. FCA 206 may display a warning when a user logs in with a UserID, which has been designated for training.

Upon successful login, FCA 206 may load (from the "users" file) any related data associated with the UserID entered in field 602. The related data may include the name of the user, the serial number, and agency. FCA 206 may also perform a check and notify the user if handheld devices (102-104) and/or laptops (110-114) have been inactive for a predetermined period of time.

In addition to the above, FCA 206 may prompt the user for additional shift information, which may include squad, shift, beat, radio, patrol code, vehicle, starting mileage, acting supervisor, status, and activity date. The information entered during this log-in sequence may be used to generate the information required for the Officer Management System (OMS). The screens that may be used for entering the OMS information will be described below.

Upon completion of the login sequence, FCA 206 may load list data required for data entry. Street and meter lists may be loaded based on the information provided in the login sequence described above. The data in these lists may be loaded based on client and/or meter zone. Other tables that may be loaded are citation books, remarks, states, vehicle colors, vehicle makes, vehicle body types, and violation codes. These tables may serve as acceptable choices in list boxes during the data entry process. In the event that a table is not present in the field device, FCA 206 may display a warning to the user.

During the data entry process, the following keys may be used on the field device. A "tab" key may be used to move to the next field. An "enter" key may be used to move to the next screen. An "esc" key may be used to move to the previous screen. Required fields may have an asterisk to indicate as such, optional fields may not. Table driven fields may allow the user to type the first letters of the choice with an auto-complete feature. For example, typing "P" in the state field may automatically select "PA". The user may scroll through the list choices with the arrow keys. Before advancing to the next screen a validation may be performed. If the validation fails, an error message may be displayed and the screen may not advance until the error(s) are corrected.

After login, the first screen which may be displayed on the field device is the "main menu" screen 700 (FIG. 7). This screen may allow the user to select the desired function by pressing the number of the function tab. A "ticket" function tab 702 may initiate the ticket entry sequence; a "time parking" function tab 704 may advance the user to the "time parking" menu; a "plate query" function tab 706 may be used to query a plate; a "duty" function tab 708 may allow the user to change the duty status; and a "logout" function tab 710 may end the current user session and return to the menu of programs. The parking enforcement functions that will be described below may be initiated from the windows-style menus described in FIGS. 3-5 and/or "main menu" screen 700.

After the user selections described above, appropriate list data for data entry is loaded, and the field data acquisition process may begin. FIG. 8 provides an illustration of an exemplary vehicle entry screen 800. Vehicle entry screen 800 may allow a user to enter the plate data 802, month data 804, tab year data 806, and state data 808 of the vehicle.

FCA 206, through vehicle entry screen 800, may allow for the recording of changes to plate data 802. FCA 206 may also automatically perform scofflaw (list of habitual parking violators) and stolen vehicle lookups based on the information entered into entry screen 800. The user may be prompted if a match is found, verifying if the user wishes to continue with the citation or "cancel" the ticket issuance process.

Figures 9, 10:
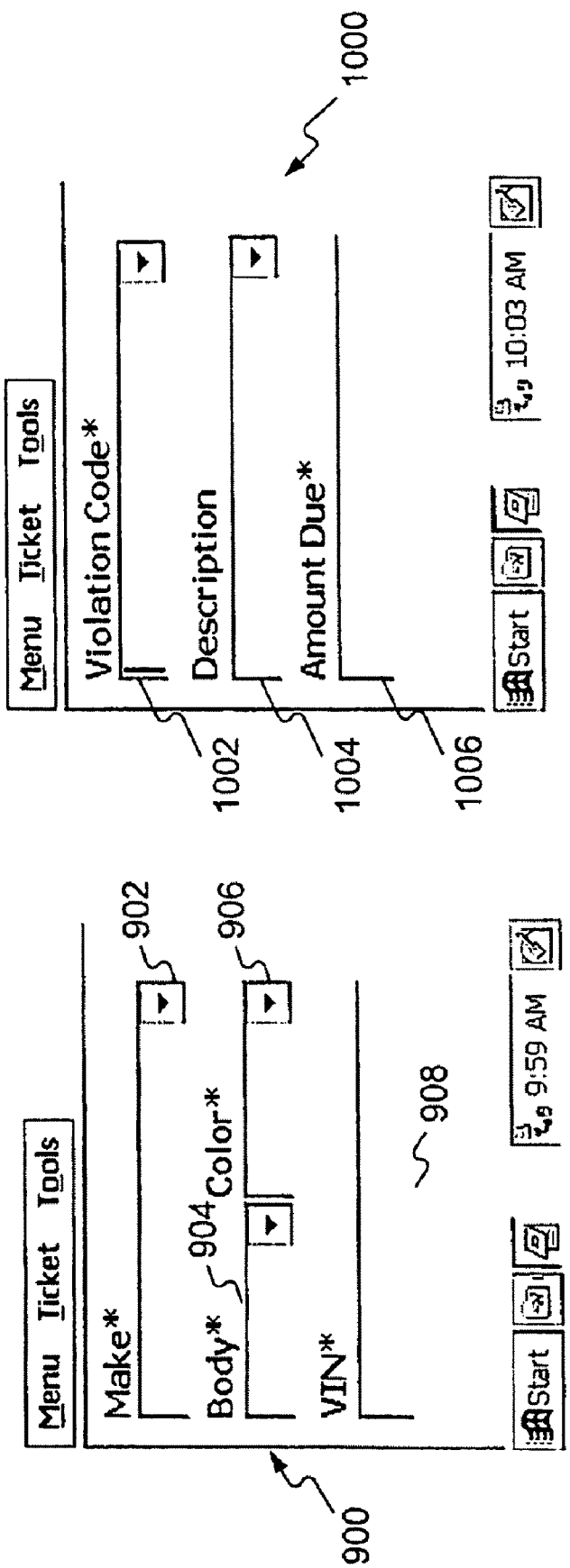
FIG. 9 is an illustration of an exemplary additional vehicle entry screen consistent with the principles of the present invention.
FIG. 10 is an illustration of an exemplary violation entry screen consistent with the principles of the present invention.

FIG. 9 provides an illustration of an exemplary vehicle entry additional screen 900. This screen may allow a user to enter the vehicle make data 902, vehicle body data 904, vehicle color data 906, and Vehicle Identification Number (VIN) data 908. If the entries for plate data 802 and state data 808 are left blank, then VIN data 908 may be required. However, if plate data 802 is entered, the user may have the option of typing in the last four (4) digits of the VIN, or "NV" if the VIN is not visible.

FIG. 10 provides an illustration of an exemplary violation entry screen 1000. This screen may allow users to enter violation details. Upon selecting a valid violation code from the "Violation Code" list box 1002, description field 1004 and amount due field 1006 may be populated based on the information in the violations table.

In one embodiment consistent with the principles of the present invention, users may be allowed to "categorize" violation codes by pre-designated groups. In this embodiment, an agency administrator may control this function by utilizing the administrative website 121 that was mentioned above and will be further discussed below. Administrative website 121 may create and manage entries to the violation table. This may allow for the grouping of violation codes and increase the description text entered for the violation codes.

FIG. 11 provides an illustration of an exemplary location entry screen 1100. This screen may allow a user to enter the location details. If the user chooses to select a valid meter identification from a "meters" list box 1102, a street field 1104 and street nbr (number) field 1106 may be populated based on the information in the meters table. Additional entry screens may be supplied to provide further location details such as the county or property where the vehicle is located.

FIG. 12 provides an illustration of an exemplary officer entry screen 1200. This screen may allow a user to view and modify officer information displayed in fields, such as badge field 1202, officer name field 1204, agency field 1206, and beat field 1208. The data for this screen may be supplied from the users table upon successful login.

Figure 13:
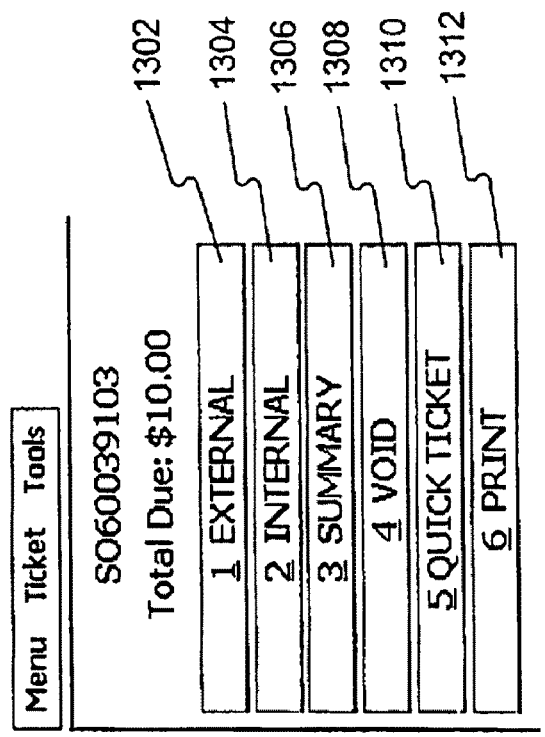
FIG. 13 is an illustration of an exemplary citation choices screen consistent with the principles of the present invention.

FIG. 13 provides an illustration of an exemplary citation choices screen 1300. This screen may allow the user to perform external comment function 1302, internal comments function 1304, summary function 1306, void function 1308, quick ticket function 1310, and print citation function 1312. This screen may also display the system generated citation number and the total due (based on the violation code that was selected).

Figure 14:
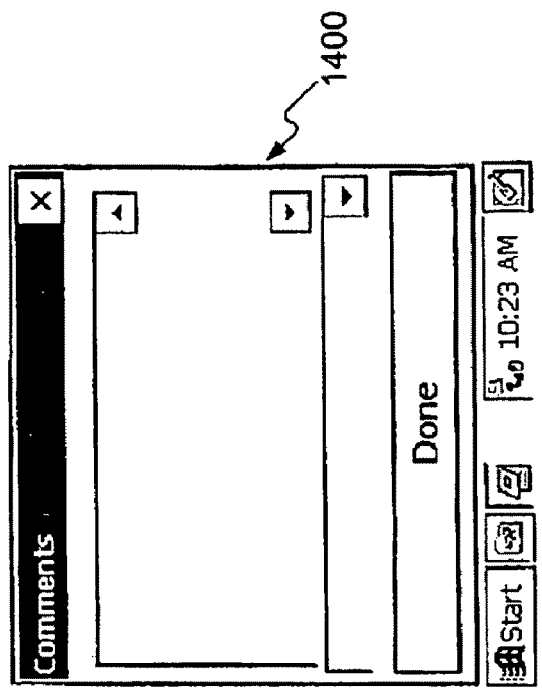
FIG. 14 is an illustration of an exemplary comment screen consistent with the principles of the present invention.

Internal and external comment functions (1302 and 1304) may invoke the comment screen 1400 illustrated in FIG. 14. This screen may allow the user to enter free-form comments and/or select pre-configured comments from a list box. The pre-configured comments may be based on the information in a remarks table. External comments may be printed on the citation. Internal comments may be stored with the citation record, but may not be printed on the citation.

Figure 15:
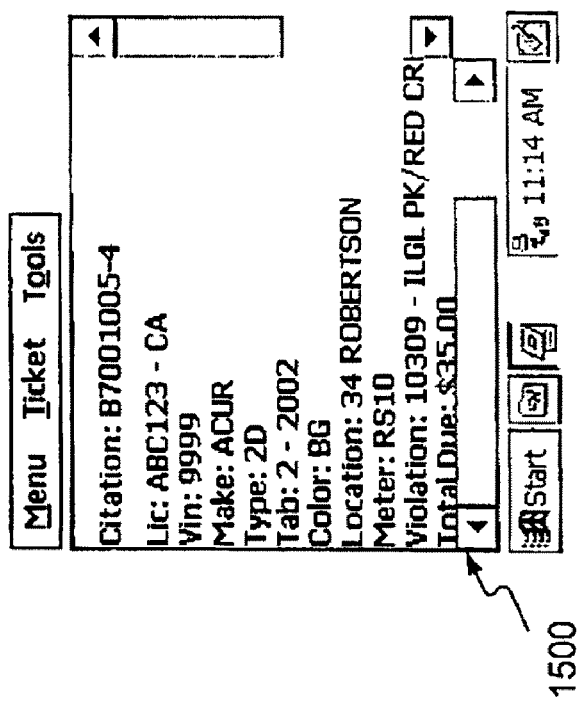
FIG. 15 is an illustration of an exemplary summary screen consistent with the principles of the present invention.

Selection of summary function 1306 (FIG. 13) displays details for the current ticket on a summary screen such as screen 1500 displayed in FIG. 15. This screen may allow a user to review the citation data in a single view. The citation data may be displayed in a read-only view of the data. This screen may also allow the user to select a citation from a chronological listing of citations previously issued and may support re-printing of the citation. Selection of void function 1308 allows the user to mark the current ticket as "void." The system may prompt the user to enter a reason for voiding the transaction.

Selection of quick ticket function 1310 may allow the user to print the current citation and upon successful print immediately issue another citation. This function may restart the citation entry sequence and may carry over the information from the previous citation. The information to be carried over may include violation code data 1002, violation description data 1004, amount due data 1006, street data 1104, plate data 802, tab month data 804, tab year data 806, state data 808, make data 802, body data 902, color data 906, and VIN data 908 from FIGS. 8 and 9.

Figure 16:
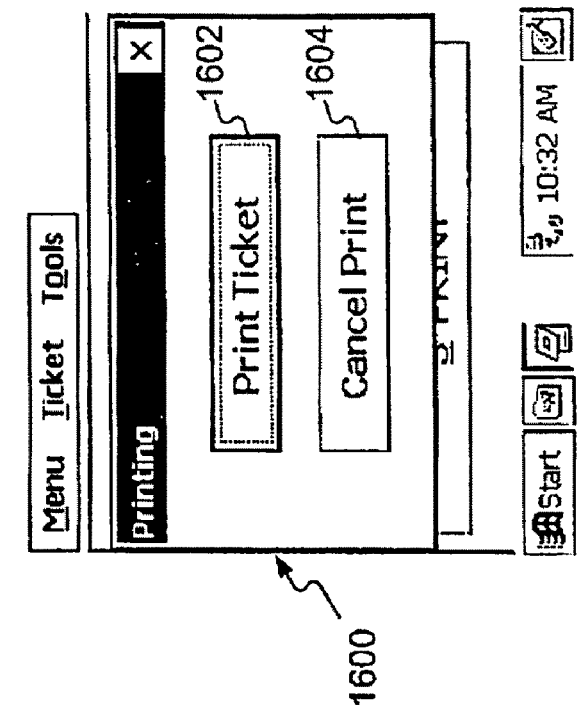
FIG. 16 is an illustration of an exemplary print screen consistent with the principles of the present invention.

Selection of quick ticket function 1310 and print citation function 1312 may invoke a print screen 1600 illustrated in FIG. 16. This screen may permit the user to select a print ticket function 1602 or a cancel print function 1604.

Before printing of the citation, FCA 206 may perform a final validation of the citation data. If any required data has not been entered, FCA 206 may prompt the user with an error message and may automatically return the user to the screen, which requires attention. In most cases, this verification may not produce an error because each screen may be validated during the data entry process. At any point prior to printing, the user may navigate to any screen and correct citation information. The user may also void any citation prior to completion. FCA 206 may also allow for re-printing of any citation that does not print appropriately.

Table 2 below provides an exemplary set of citation data elements that may be entered via the data entry screens described above.

TABLE 2

|  | Field Name | Data Type | Size | Required | Table | Notes |
|---|---|---|---|---|---|---|
| Vehicle | Plate | ALPHA | 10 | N | N |  |
|  | Tab Month | NUMERIC | 2 | N | N |  |
|  | Tab Year | NUMERIC | 4 | N | N |  |
|  | State | ALPHA | 2 | N | Y |  |
| Vehicle Additional | Make | ALPHA | 4 | Y | Y |  |
|  | Body | ALPHA | 2 | Y | Y |  |
|  | Color | ALPHA | 2 | Y | Y |  |
|  | VIN | ALPHA | 21 | Y | N | May be the last 4 characters of VIN when Plate is entered. May be full VIN "NV" when plate is not entered. |
| Violation | Violation Code | ALPHA | 10 | Y | Y |  |
|  | Description | ALPHA | 21 | Y | Y |  |
|  | Total Due | NUMERIC | 6 | Y | N | Looked up based on Violation Code. |
| Location | Meter | ALPHA | 10 | N | Y |  |
|  | Street | ALPHA | 21 | Y | Y |  |
|  | Street Nbr | ALPHA | 5 | Y | N |  |
| Officer | Badge | ALPHA | 10 | Y | N |  |
|  | Officer Name | ALPHA | 21 | Y | N |  |
|  | Agency | ALPHA | 2 | Y | Y |  |
|  | Beat | ALPHA | 3 | Y | Y |  |
| Other | Citation Number | ALPHA | 10 | Y | N | Auto generated, read only. Checksum calculated for last digit. |
|  | Marked Time | Timestamp |  | N | N |  |

TABLE 2-continued

| Field Name | Data Type | Size | Required | Table | Notes |
|---|---|---|---|---|---|
| Issue Date and Time | Timestamp | | Y | N | Automatically time-stamped by the system. |
| Offense Data and Time | Timestamp | | Y | N | |
| Preferential Parking District Number | ALPHA | | N | N | |
| Public Comments | ALPHA | | N | N | Free form or list selection |
| Private Comments | ALPHA | | N | N | Free form or list selection |

Figure 17:
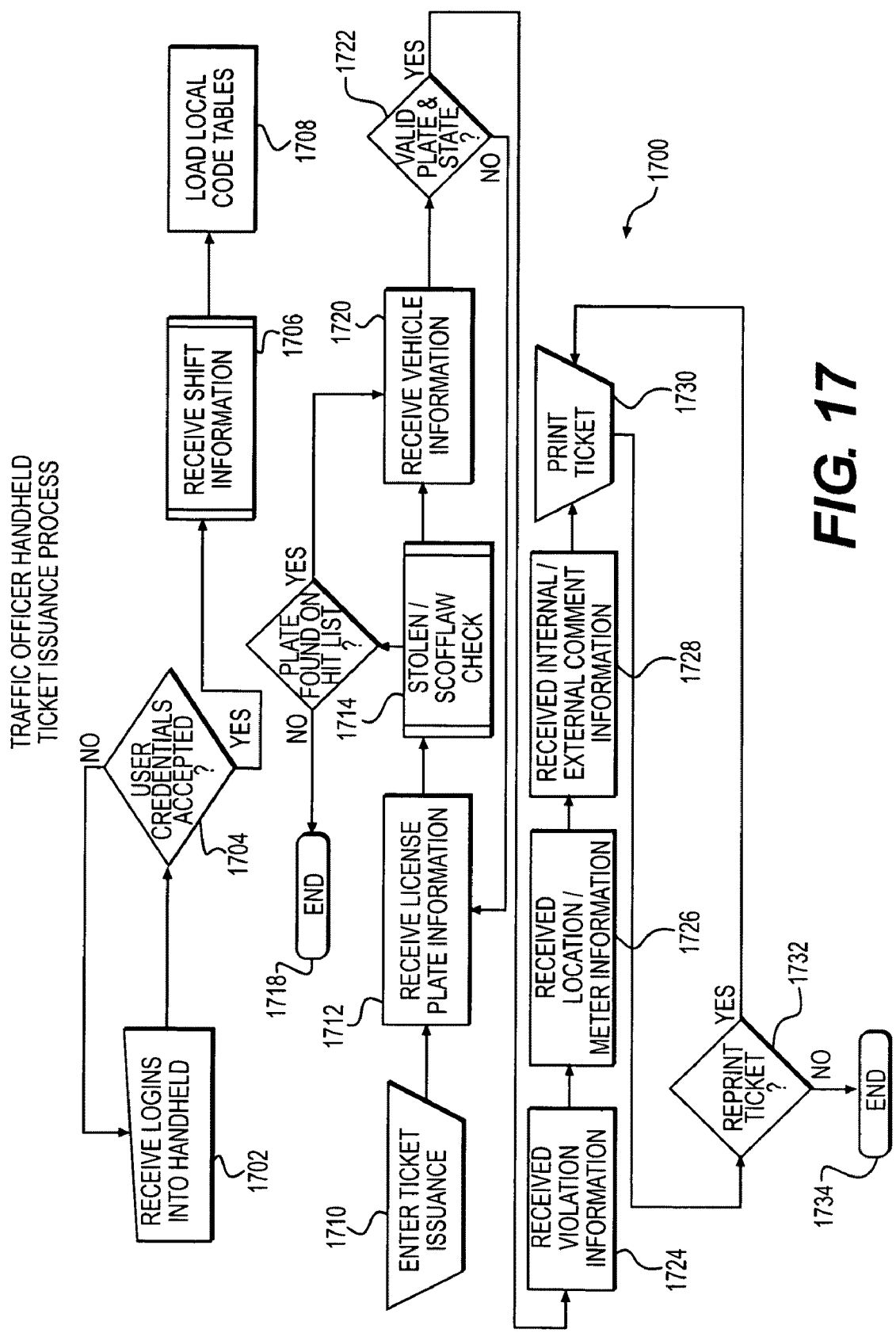
FIG. 17 is an illustration of an exemplary flow chart of the ticket issuance process, consistent with the principles of the present invention.
Figure 20:
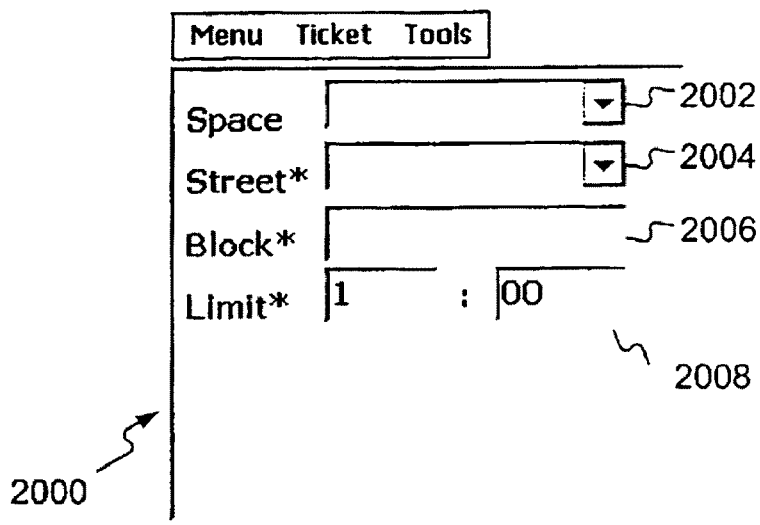
FIG. 20 is an illustration of an exemplary location information entry screen consistent with the present invention.

FIG. 17 provides an exemplary flow chart illustrating a ticket issuance process 1700. In process 1700, the handheld receives the user login and user credentials are validated (stage 1702). At stage 1704, if user credentials are not accepted the process returns to stage 1702. However, if at stage 1704 user credentials are accepted, process 1700 continues to stage 1706, where user entered shift information is received. After shift information is received, local code tables are loaded at stage 1708.

Once local tables are loaded, the handheld may enter a ticket issuance stage 1710 and proceed to receive license information (stage 1712). Next, process 1700 proceeds to stage 1714, where license plate information is checked against a scofflaw list to determined if the license plate is stolen. If the license is on the scofflaw list, the license plate is checked against a hit list (stage 1716). If the license plate does not appear on the hit list, process 1700 proceeds to stage 1718 and ends. However, if the license plate appears on the hit list or does not appear on the scofflaw list (stage 1714), the handheld receives the vehicle information (stage 1720).

Once the vehicle information is received, the license plate is checked to determine if a valid state and license plate was received (stage 1722). If a valid state and license plate was not received, the process 1700 returns to stage 1712. However, if a valid state and license plate was received, the violation information is received at stage 1724. Then, the location/meter information is received at stage 1726, and the internal/external comment information is received at stage 1728.

Next, process 1700 proceeds to stage 1730, where the ticket is printed. After the ticket is initially printed, the handheld may reprint the ticket (stage 1732). If the ticket is to be reprinted, process 1700 returns to stage 1730. Otherwise, process 1700 proceeds to stage 1734 and ends.

FIG. 18 provides an illustration of an exemplary timed parking screen 1800. This screen may allow a user to select an enter plates function 1802, a location review function 1804, a plate review function 1806, and a purge review function 1808. Entering plates function 1802 may allow the user to enter plates to be timed. This may be accomplished via two additional data entry screens. First data entry screen 1900 (FIG. 19) may allow the entry of the plate information (e.g., plate 1902 and state 1904), vehicle information (e.g., vehicle type 1906), and stem 1908. Second data entry screen 2000 may allow the entry of the location information (e.g., the space 2002, the street 2004, and the block 2006) and the time limit 2008.

Figure 21:
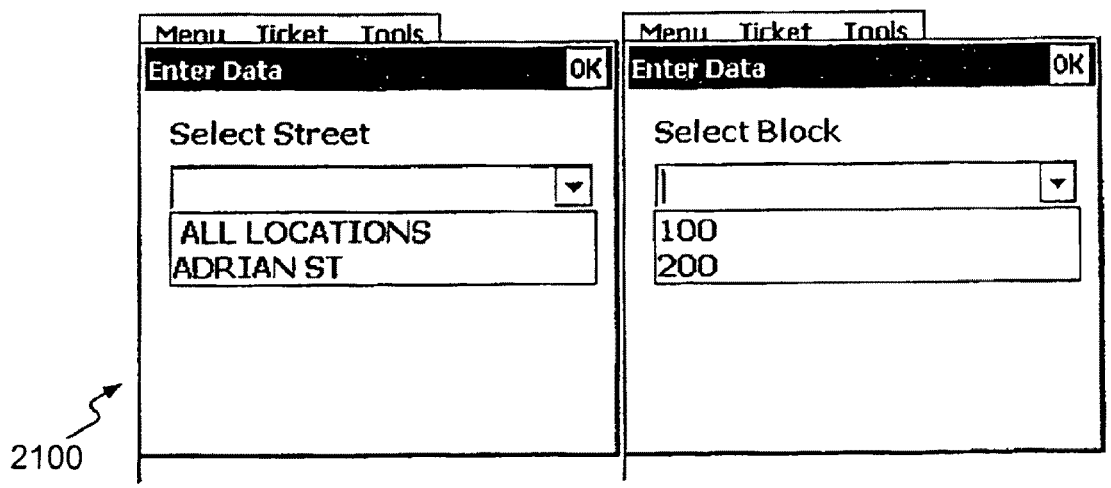
FIG. 21 is an illustration of an exemplary timed parking selection screen consistent with the principles of the present invention.

Furthermore, in FIG. 18, location review function 1804 may allow the user to select criteria for the time parking list. The parking list may be generated and/or sorted based on a number of criteria, for example the street and block where the vehicles are located. FIG. 21 illustrates the possible selection screens that may be used to generate the parking list. In selection screen 2100, if the "all locations" selection is used, all entries in the time parking list may be displayed. The parking list may also be generated base on the plate criterion illustrated in FIG. 22. FIG. 23 illustrates an exemplary timed parking list based on the selection of the plate criterion.

In the exemplary timed parking list, if a user selects a plate number, the details for the plate number may be displayed. In addition to viewing the information, the user may use the information for the following functions: 1) issue a ticket based on the current plate selection; 2) add more plates via the "enter plates" function; 3) toggle to view only "expired" plates and toggle back to view all plates in the list; and 4) delete the selected plate from the list.

FIG. 24 illustrates exemplary functions that may be provide under the "tools" menu 2402. Once selected, "tools" menu 2402 may permit selection of "about client" function 2404, "ticket review" function 2406, "print summary report" function 2408, and "system time" function 2409. Selection of "about client" function 2404 may display the version number and the build date for the software operating on FCA 206. "Ticket review" function 2406 may provide the ticket entry screens used in the ticket entry process. The information for the selected ticket may not be modified, but comments may be added and the ticket may be reprinted and voided. "Print summary report" function 2408 may provide the users work date and the number of citations issued. "System time" function 2410 may provide the current system time.

In one embodiment consistent with the present invention, the officer management system (OMS) may provide the means of capturing various shift details pertaining to officer productivity. The following describes the OMS function with screen definitions, data formats, and screen flows from the perspective of the field devices. In the following description, even though handhelds may be specifically mentioned, the description may also apply to other types of field devices (e.g., laptops).

Upon successful login into a handheld device (102-108), the device displays an exemplary shift information screen 2500 illustrated in FIG. 25. In this screen, user-entered responses for the shift are received. If the user is at the start of a shift the "ACTIVITY" field 2502 may be pre-populated with "ST" (start of shift). User-entered information for "squad" field 2504, "beat" field 2506, shift field 2508, "patrol" field 2509, and "act date" field 2512 may be received. After receiving the shift information and actuating the "accept" tab 2514, the user may be prompted with the equipment assignment information for the shift.

Figure 26:
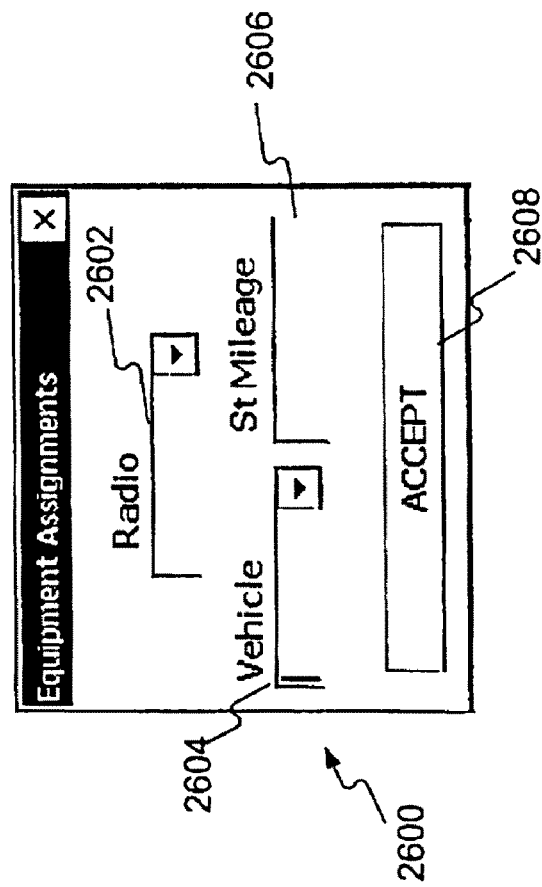
FIG. 26 is an illustration of an exemplary equipment assignment screen consistent with the principles of the present invention.

FIG. 26 provides an illustration of an exemplary equipment assignment screen 2600. This screen may receive user-entered information regarding the equipment that may be used during the session/shift. This may be required because equipment may be issued on a daily basis, rather than assigned permanently to an individual user. The user-entered data may define the equipment, including "radio" field 2602, "vehicle" field 2604, and "St mileage" field 2606. After the foregoing information is received, the user may activate the "accept" button 2608 to complete the data entry process of assignment screen 2600.

Figure 27:
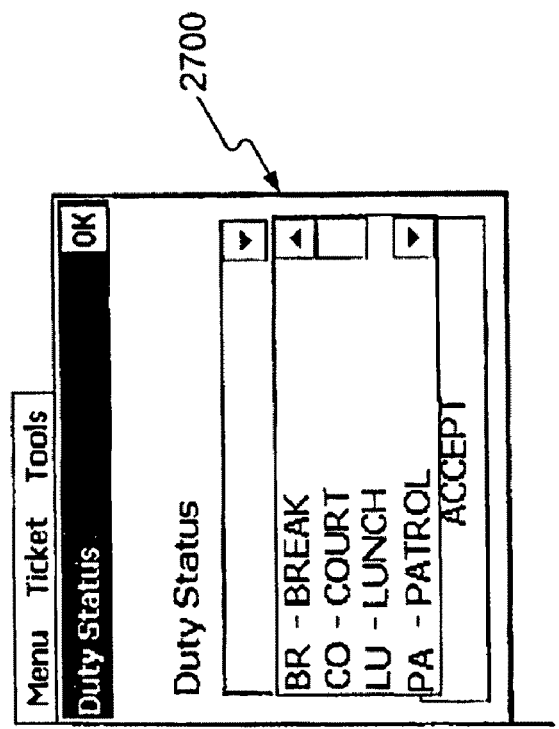
FIG. 27 is an illustration of an exemplary duty status screen consistent with the principles of the present invention.

During the course of a shift, users may be required to enter changes to their current activities. That is, once the user moves from one activity to another, the user may invoke the duty status screen 2700 (FIG. 27) and select the new activity (e.g., the activity may indicate whether the user is on break, lunch, patrol, or at court). Selecting a new activity may create another entry in the local handheld activity table.

After completing a shift/session, the user may once again select duty status screen 2700 and select one of the approved "Log Off" statuses (see Table 3 below). This activity may also cause an entry to be created in the local handheld activity table. The data collected throughout the shift may be uploaded to central processing server 120 and marked as new. The data may be used to create a record conforming with a standard used by Ticket Information Management System (TIMS) mainframe 132 (e.g., TIMS 990 standard). This record may be transmitted to Ticket Information Management System (TIMS) mainframe 132, and after transmission, central processing server 120 may mark the transmitted data as "transferred." Once TIMS mainframe 112 receives the transmitted data, TIMS mainframe 112 provides a confirmation file back to central processing server 120, which upon receipt changes the status of the transmitted data to "confirmed."

TABLE 3

LOG-OFF (End of Shift)
LOG-OFF (Family Illness)
LOG-OFF (IOD)
LOG-OFF (Other)
LOG-OFF (Prevent Medicine)
LOG-OFF (Sick)
LOG-OFF (T.O. Time)
LOG-OFF (Vacation)

Figure 28:
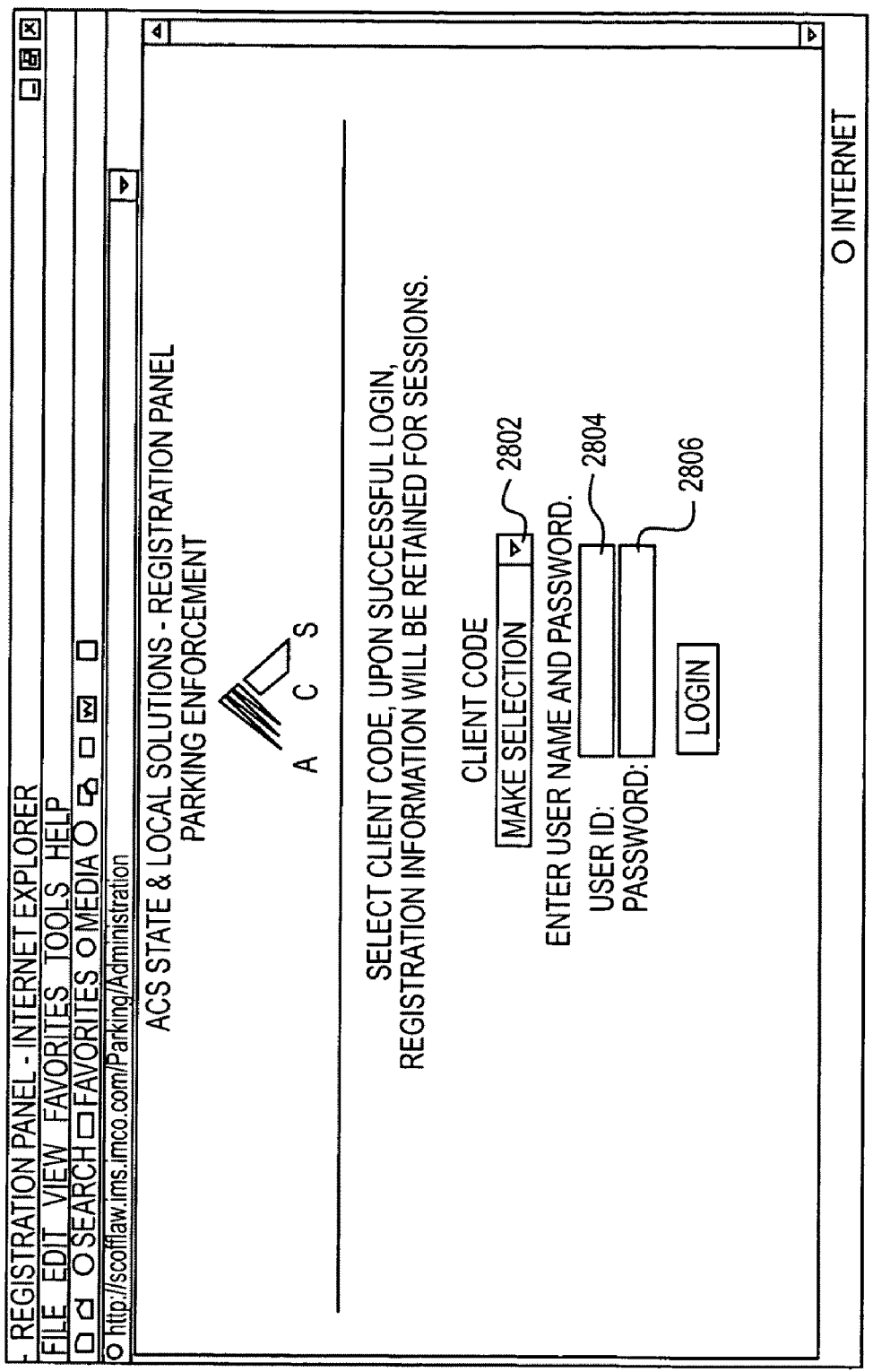
FIG. 28 is an illustration of an exemplary registration screen consistent with the principles of the present invention.

Administrative website 121 (FIG. 1), consistent with the principles of the present invention, provides access to and management of the data elements of central processing server 120. Users may be granted access to administrative website 121 through a registration screen 2800, which is illustrated in FIG. 28. At screen 2800, the user may enter a client code (or assigned agency) field 2802, a UserID field 2804, and a password field 2806. If a login failure occurs because improper information is entered, the user may be provided with an error screen, which may allow the user to return to registration screen 2800.

Figure 29:
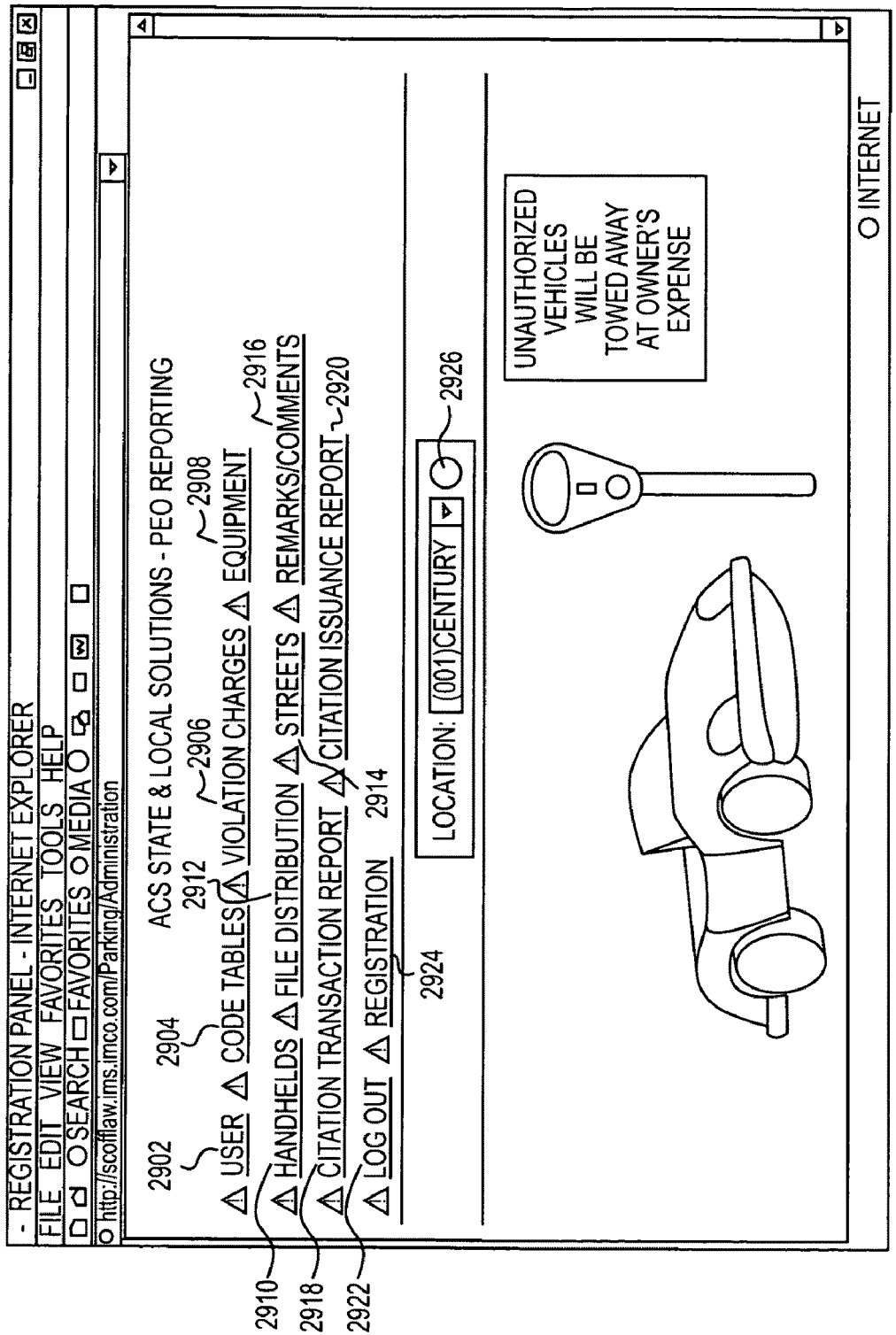
FIG. 29 is an illustration of an exemplary main menu screen consistent with the principles of the present invention.

Once the user logs into the administrative website, a main menu may provide options for the administration and maintenance of the data elements in central processing server 120. An exemplary main menu 2900 is illustrated in FIG. 29. From main menu 2900, users may have access to a "user" link 2902, "code tables" link 2904, "violations charges" link 2906, "equipment" link 2908, "handhelds" link 2910, "file distribution" link 2912, "street" link 2914, "remarks/comments" link 2916, "citation transaction report" link 2918, "citation issuance report" link 2920, "log out" link 2922, "registration" link 2924, and "location" link 2926. Selecting "registration" link 2924 re-directs the user to registration screen 2800, which was describe above. The functions of the remaining links will be described in detail below.

Figure 30:
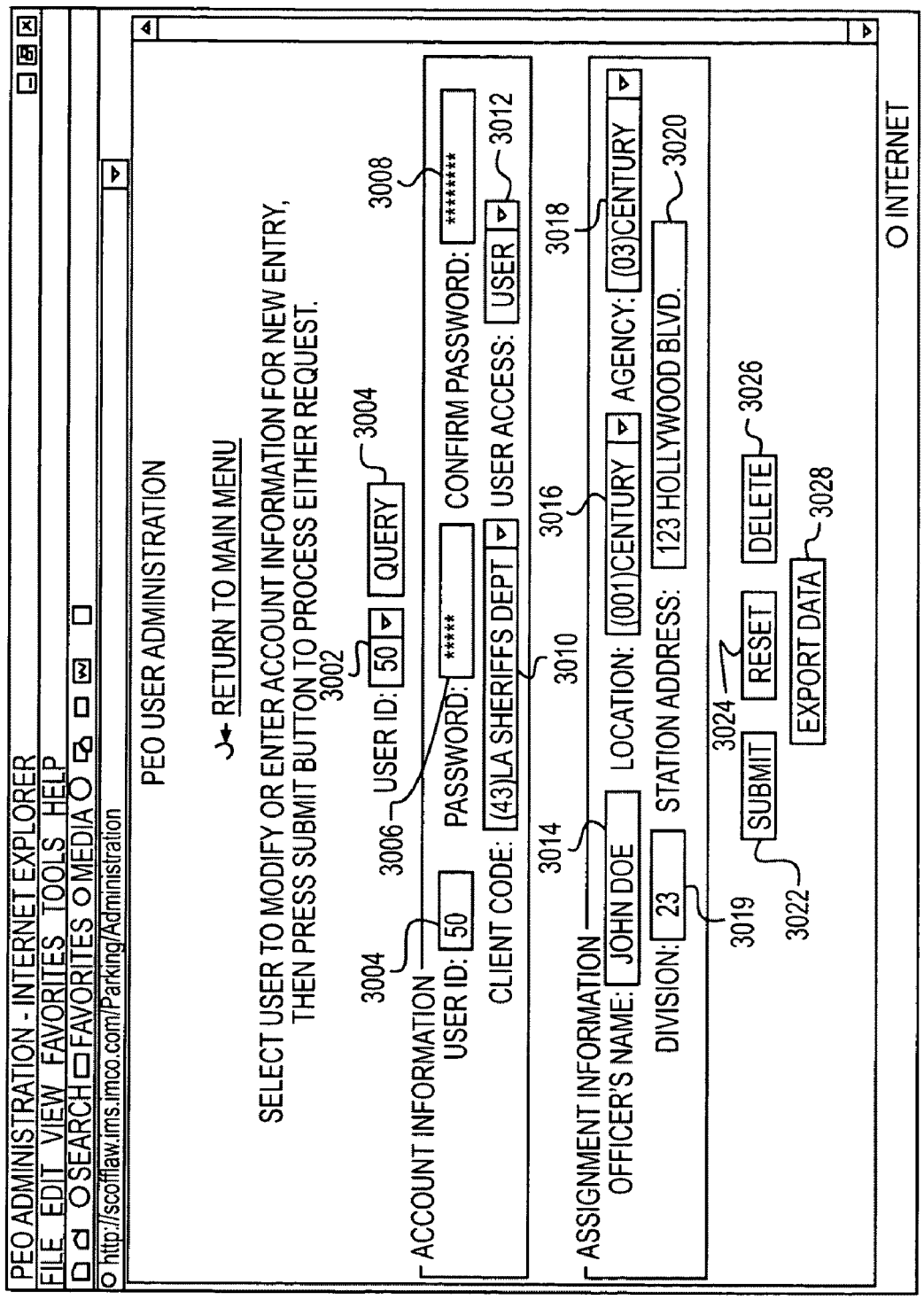
FIG. 30 is an illustration of an exemplary parking enforcement (PEO) user administration screen, consistent with the principles of the present invention.

"User" link 2902 may direct users to a Parking Enforcement (PEO) User Administration screen 3000 (FIG. 30). At this screen, an administrative/supervisory user may create users for handheld devices (102-108) and/or the citation management website in the database tables. This screen may require the user to enter a "UserID" at field 3002. The user may select the "query" button 3004 for "UserID" 3002 to be automatically retrieved.

The user may also be required to enter the account information, in a UserID field 3004, password field 3006, confirm password field 3008, client code field 3010, and user access field 3012. Client code field 3010 allows the user to select the division in which the officer may be entered. Access field 3012 refers to the level of user authorization. For example, an administrator level may have access to all panels, links, reports, and data tables, with the ability to ADD, MODIFY, and DELETE data; a supervisor level may have access to limited panels, links, reports, and data tables, based on client/agency information, with the ability to view and modify data; and a user level may have access to links and general reports, with the ability to modify limited data relative to the individuals account. For training purposes, a trainee authorization level may also be provided.

In addition to the above, the user may also be required to enter assignment information, which may include an officer name field 3014, a location field 3016, an agency field 3018, a division field 3019, and a station address field 3020. After or during the data entry processes described above, the user may use one or more buttons to manage data entry (e.g., a "SUBMIT" button 3022 may be used to update the database with the entered information; a "RESET" button 3024 may be used to clear the page and allow for re-entry of data; a "DELETE" button 3026 may be used for deleting data from the database; and an "EXPORT DATA" button 3028 may be used for transferring data to the field devices.).

Figure 31:
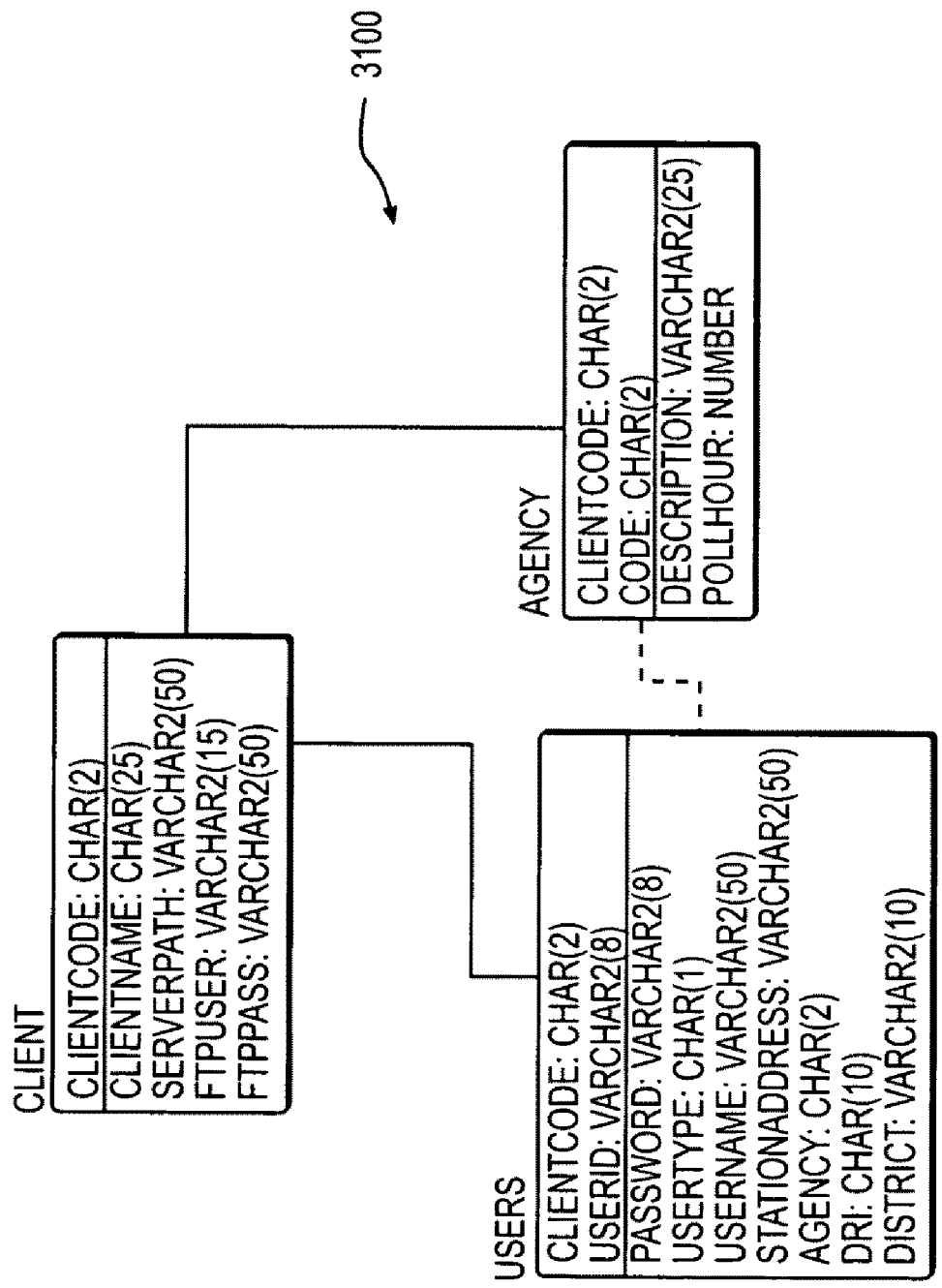
FIG. 31 is a layout of exemplary user tables consistent with the principles of the present invention.

User Administration screen 3000 (FIG. 30) may be used to populate physical tables 3100, which may be used to defined "users." Refer to FIG. 31 for an exemplary "user" database construction and layout. Consistent with the principles of the present invention, a user may be defined as an individual who is granted access to the field devices and the administrative website. In order to separate clients (e.g. municipalities), locations (e.g., agencies), and access to views and data, users may be created for a specific client, at a specific agency, with different administrative privileges. This architecture may enable clients to view and manage only their respective personnel.

Figure 32:
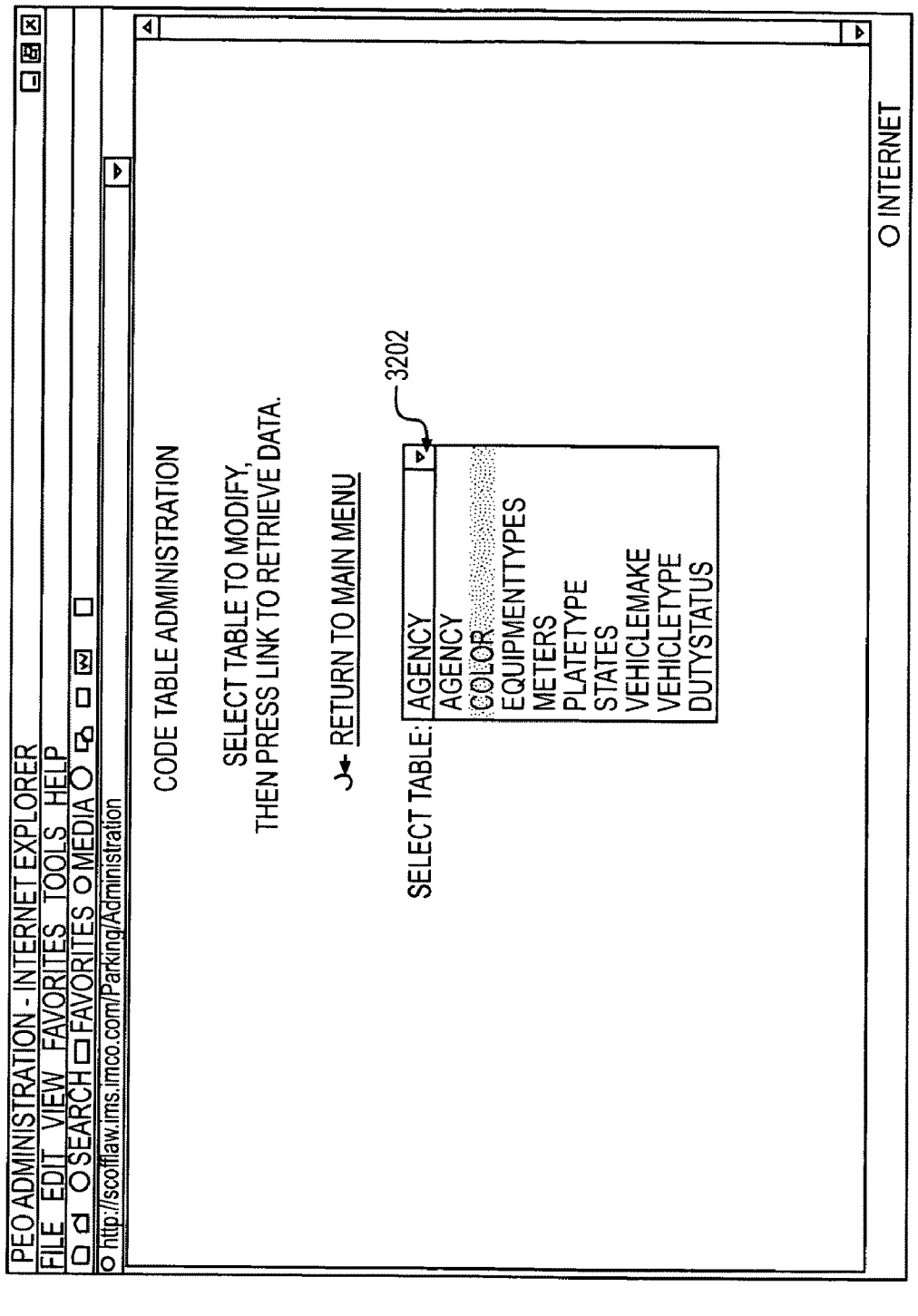
FIG. 32 is an illustration of an exemplary code table administration screen consistent with the principles of the present invention.
Figure 33:
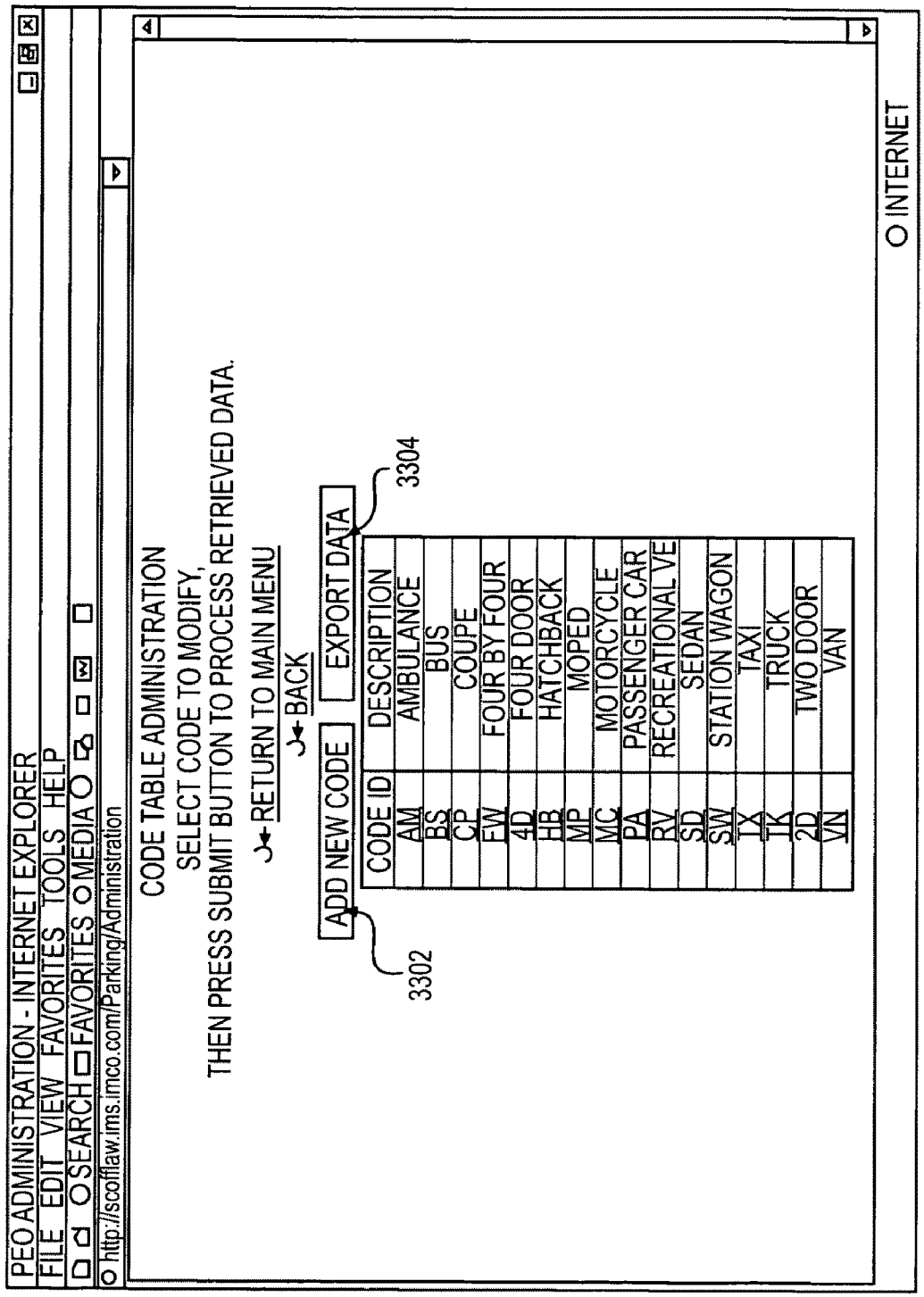
FIG. 33 is an illustration of an exemplary code table administration screen, displaying entries of a selected code table, consistent with the principles of the present invention.
Figure 34:
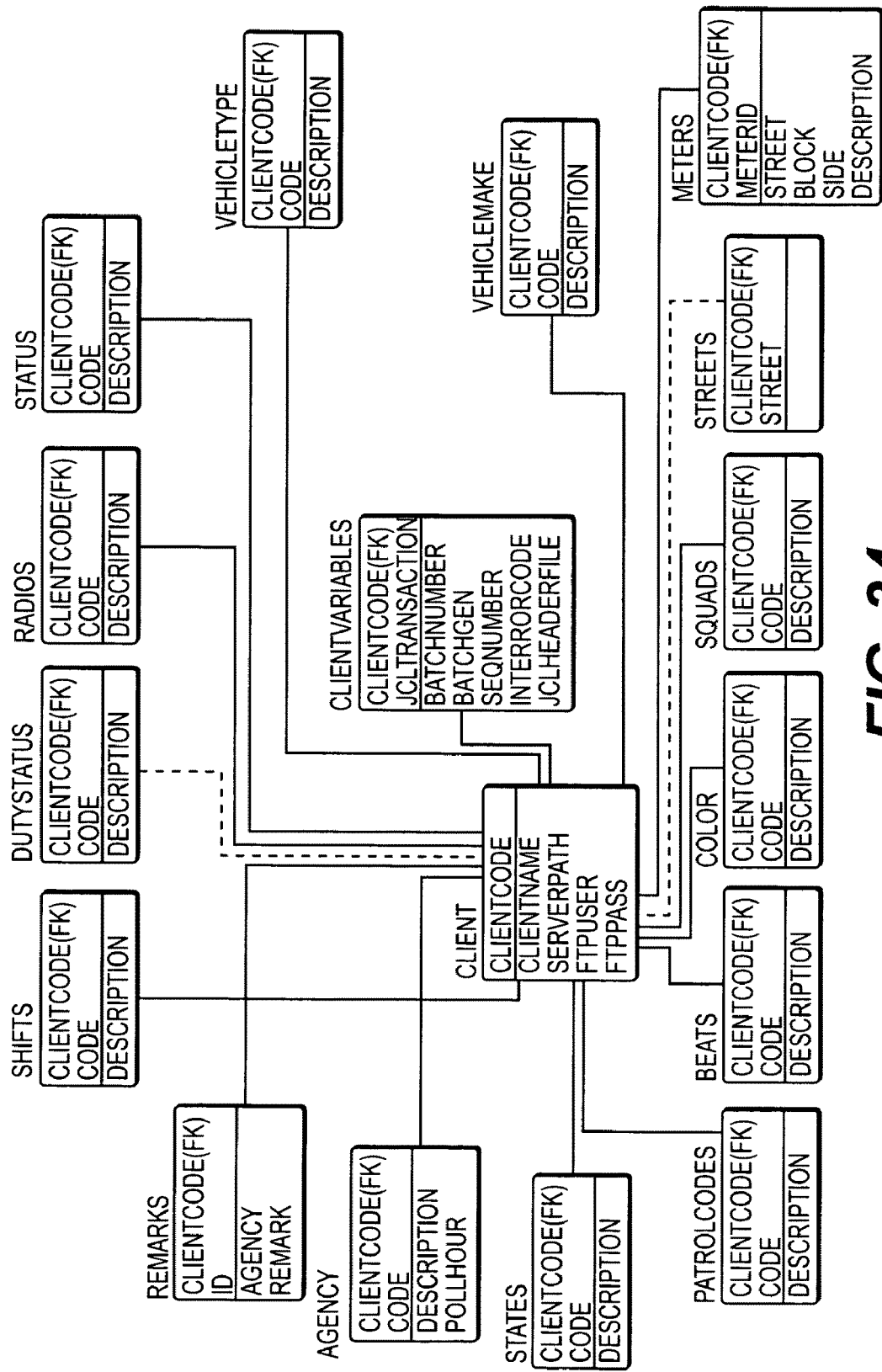
FIG. 34 is an illustration of an exemplary "code table" database construction and layout consistent with the principles of the present invention.

Returning to FIG. 29, when a user selects "code tables" link 2904, the user may be directed to a code table administration screen 3200 (FIG. 32). This screen may allow administrators to read, write, and modify code tables. A drop down list 3202 may contain the available code tables for a particular client. Selecting a code table may invoke the appropriate next screen, which controls the appropriate code table. FIG. 33 provides an illustration of an exemplary code table administration screen 3300, displaying entries of a selected code table. Table information may be defined within several tables, depending on which table may be selected from the website determines which other tables may be effected. Refer to FIG. 34 for an exemplary "code table" database construction and layout.

Figure 35:
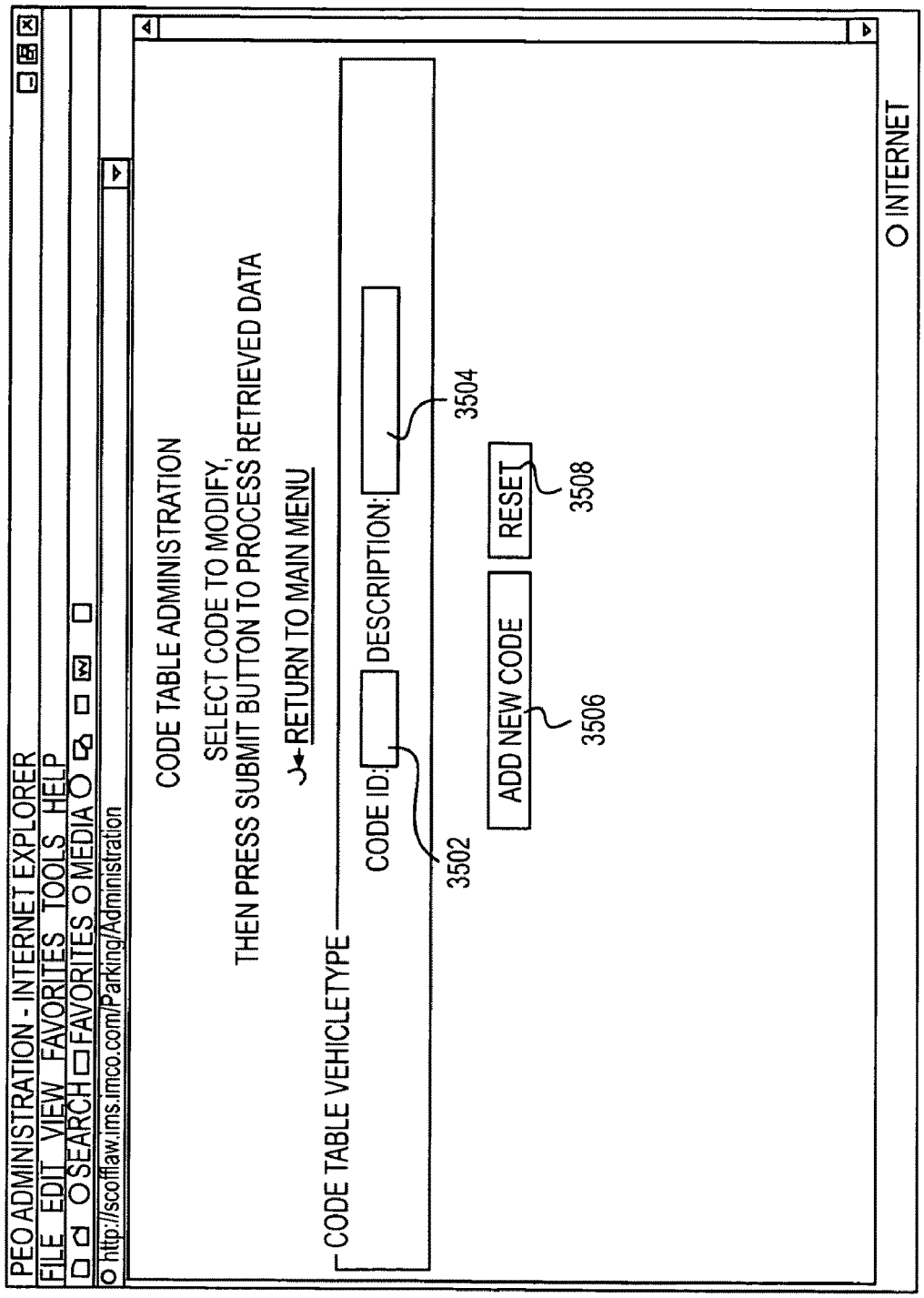
FIG. 35 is an illustration of an exemplary "add new code" screen consistent with the principles of the present invention.

Selection of the "add new code" button 3303 in screen 3300 invokes an "add new code" screen 3500 (FIG. 35), where the user may enter the code ID 3502 and the description 3504. Activation of the "add new code" button 3506 in screen 3500 commits the entered data to the database. The "RESET" button 3508 clears the screen for data re-entry. Selection of the "EXPORT DATA" button 3304 in screen 3300 updates the field devices.

Figure 36:
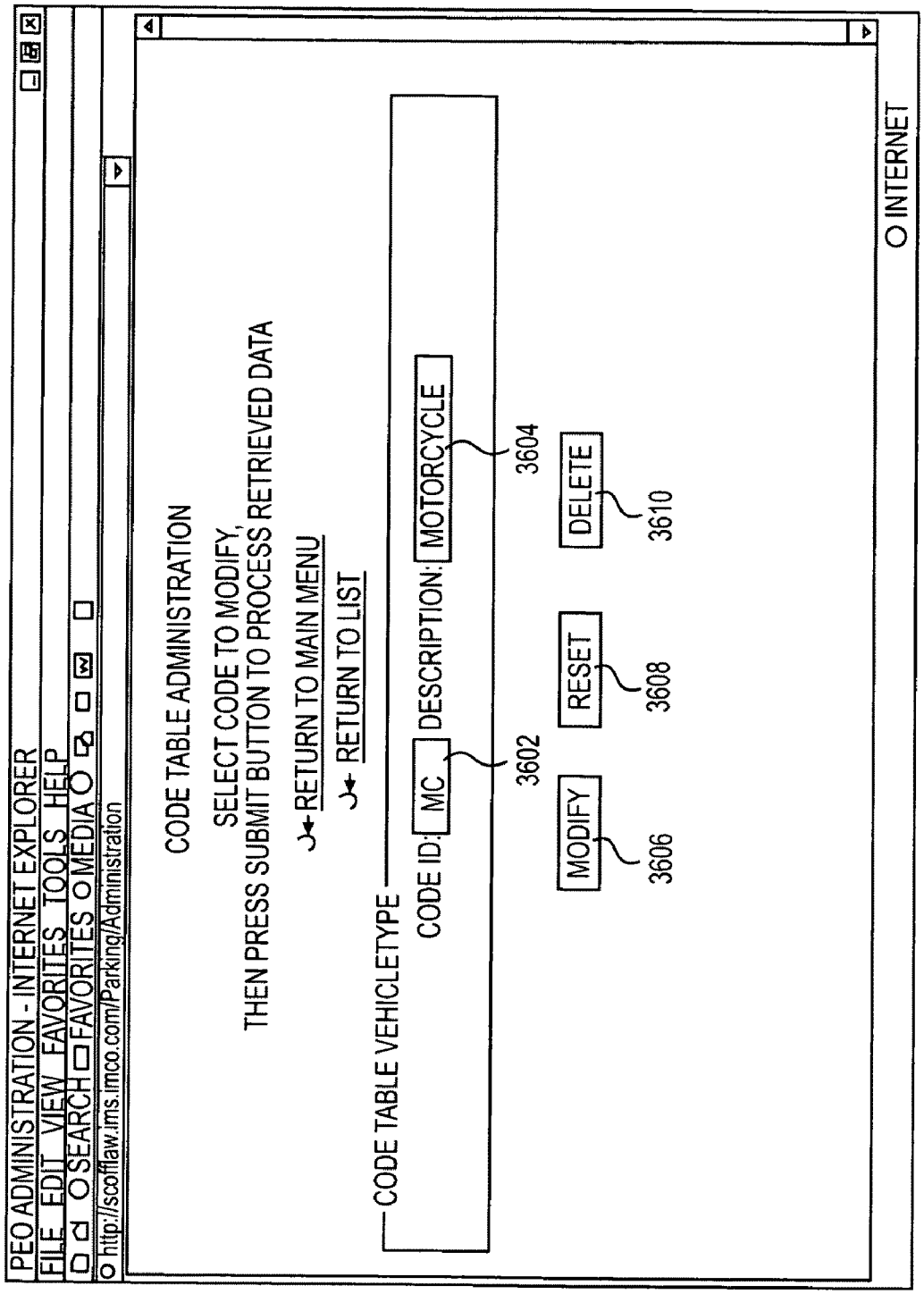
FIG. 36 is an exemplary "delete/modify" screen consistent with the principles of the present invention.

In screen 3300, if the user clicks on a code table, a "delete/modify" screen 3600 (FIG. 36) may be displayed. In this screen, the user may enter the "code ID" 3602 and the "description" 3604. The user may also enter the "MODIFY" button 3606, which may be used to modify the code table; the "RESET" button 3008, which may be used to clear the screen; or the "DELETE" button 3610, which may be used to deleted the code table.

Returning to FIG. 29, if the user selects "violation charges" tab 2906, the user may be directed to PEO Violations Administration screen 3700 (FIG. 37). This screen may allow users to look up violation codes and descriptors or add values. Only authorized users may be allowed to add and modify violation data, which may be imported from an external source, such as TIMS mainframe 132. The user may enter the violation code 3702 and/or the description 3704 and then select the SUBMIT button 3706. This action may cause the rest of the fields (e.g., charge code 3708, description 3710, active date 3712, fine amount 3714, additional amount 3716, and total amount 3718) in screen 3700 to be populated. The user may use the "ADD" button to enter new violation data and the "RESET" to clear the screen data. FIG. 38 provides an illustration of another exemplary violation screen 3800. In this screen, the user may enter charge code data 3708, description data 3710, active date data 3712, fine amount data 3714, and additional amount data 3716. The user may also select a "MODIFY" button 3802, which may be used to modify the violation codes; a "RESET" button 3804, which may be used to clear the screen; or a "DELETE" button 3806, which may be used to deleted the violation codes.

Figure 39:
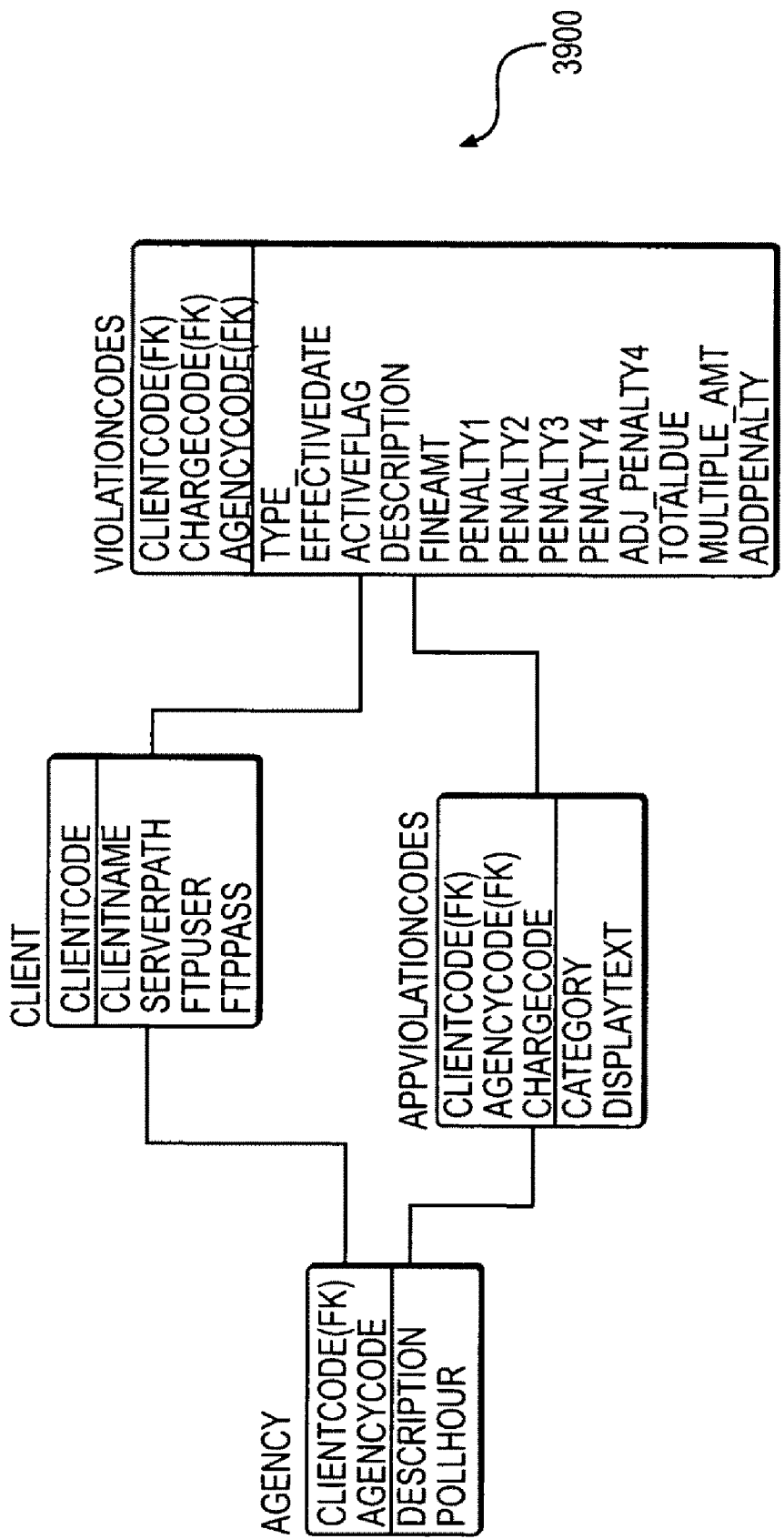
FIG. 39 is a layout of exemplary violation data structures consistent with the principles of the present invention.

The violation codes or violation charges may be created utilizing tables, such as client, agency, AppViolationCodes, and ViolationCodes tables. Violation codes may be created for a specified client (e.g., municipality) and/or an individual location (e.g., agency). Violation codes may also be grouped for an agency in certain categories. This architecture may enable clients to view and manage only their respective data. Refer to FIG. 39 for an exemplary "violations code" database table construction and layout.

Figure 40:
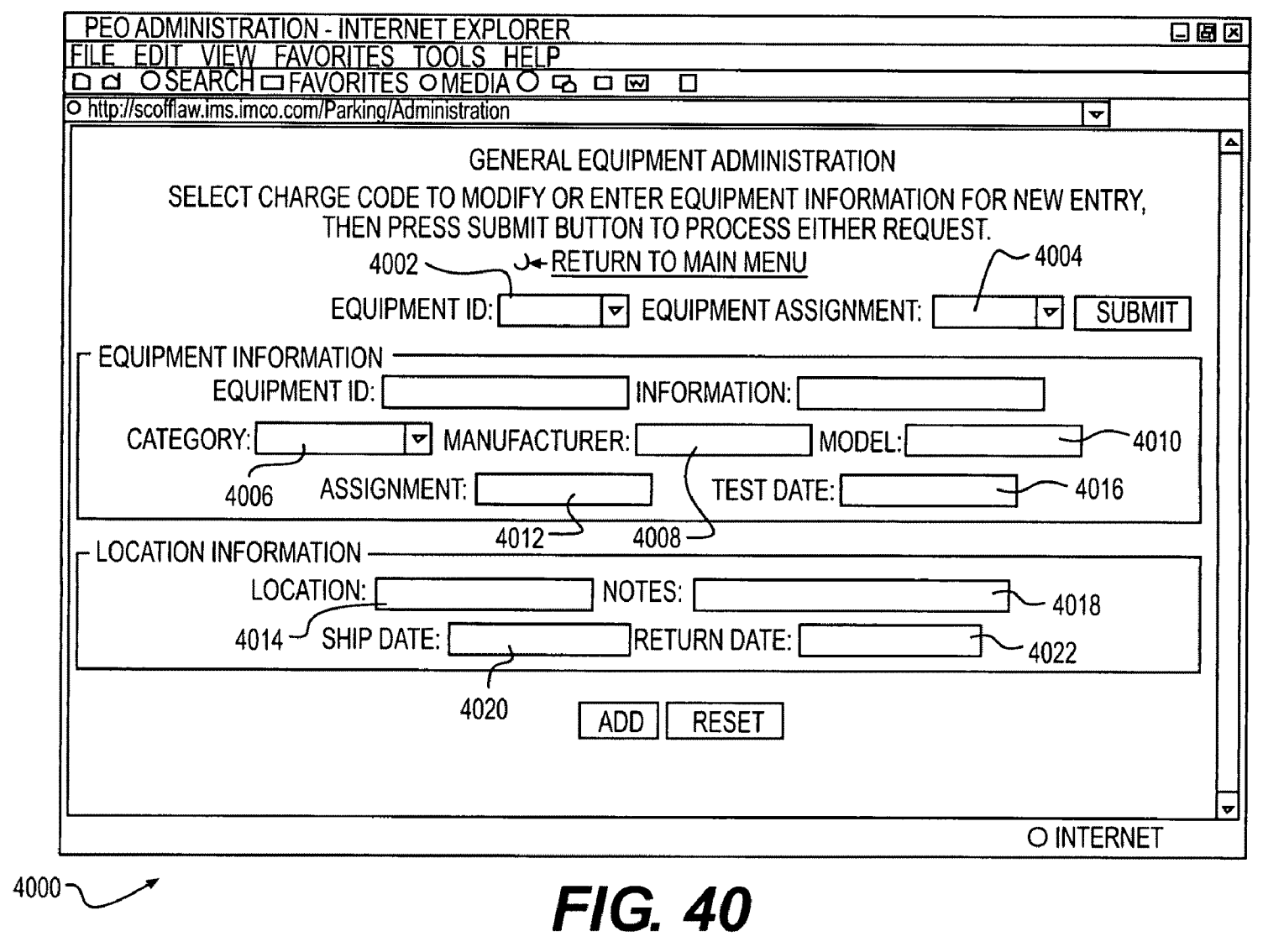

Returning to FIG. 29, if the user selects "equipment" link 2908 or "handhelds" link 2910, the user may be directed to the General Equipment Administration screen 4000 (FIG. 40). At screen 4000, the user may enter an equipment ID data 4002 and/or an equipment assignment data 4004; entering one of the foregoing items may automatically display the other, along with a category data 4006, an equipment manufacturer data 4008, a model number data 4010, an assignment data 4012, and a location data 4014. If appropriate, other entry items such as a test date data 4016, notes data 4018, ship date data 4020, and return date data 4022 may also be automatically displayed or entered by the user.

Figure 41:
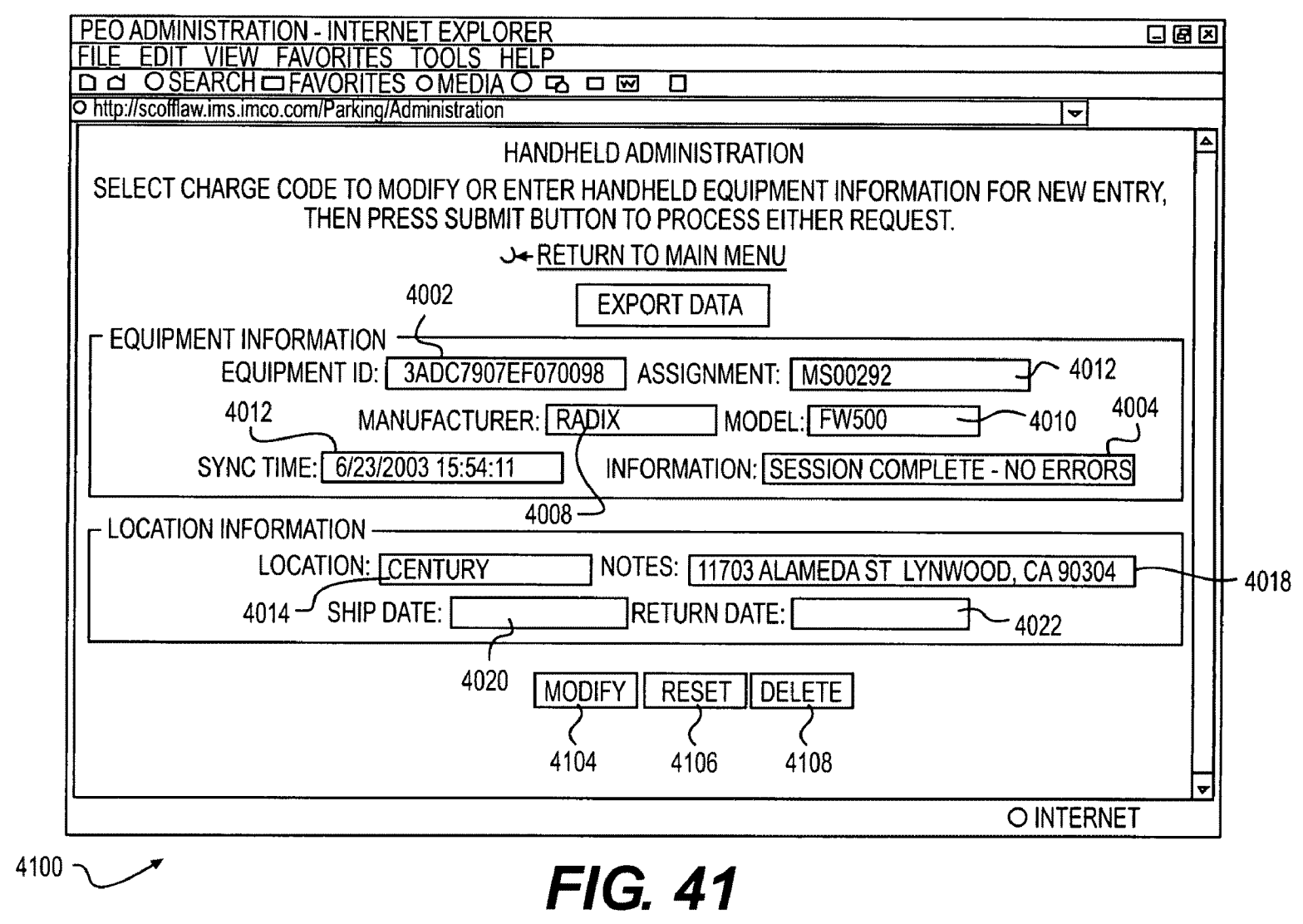

If screen 4000 is displayed using handhelds link 2910, a handhelds administration screen 4100 (FIG. 41) may follow screen 4000. This screen may allow data corresponding to the handhelds to be inputted into the handheld tables. Screen 4100 provides similar data items to screen 4000. The "sync time" data 4102 in screen 4100 may refer to the time the handheld was returned to a cradle for recharging and downloading. At this screen, the user may also select a "MODIFY" button 4104, which may be used to modify the handheld information; a "RESET" button 4106, which may be used to clear the screen; or a "DELETE" button 4108, which may be used to deleted the handheld information.

Figure 42:
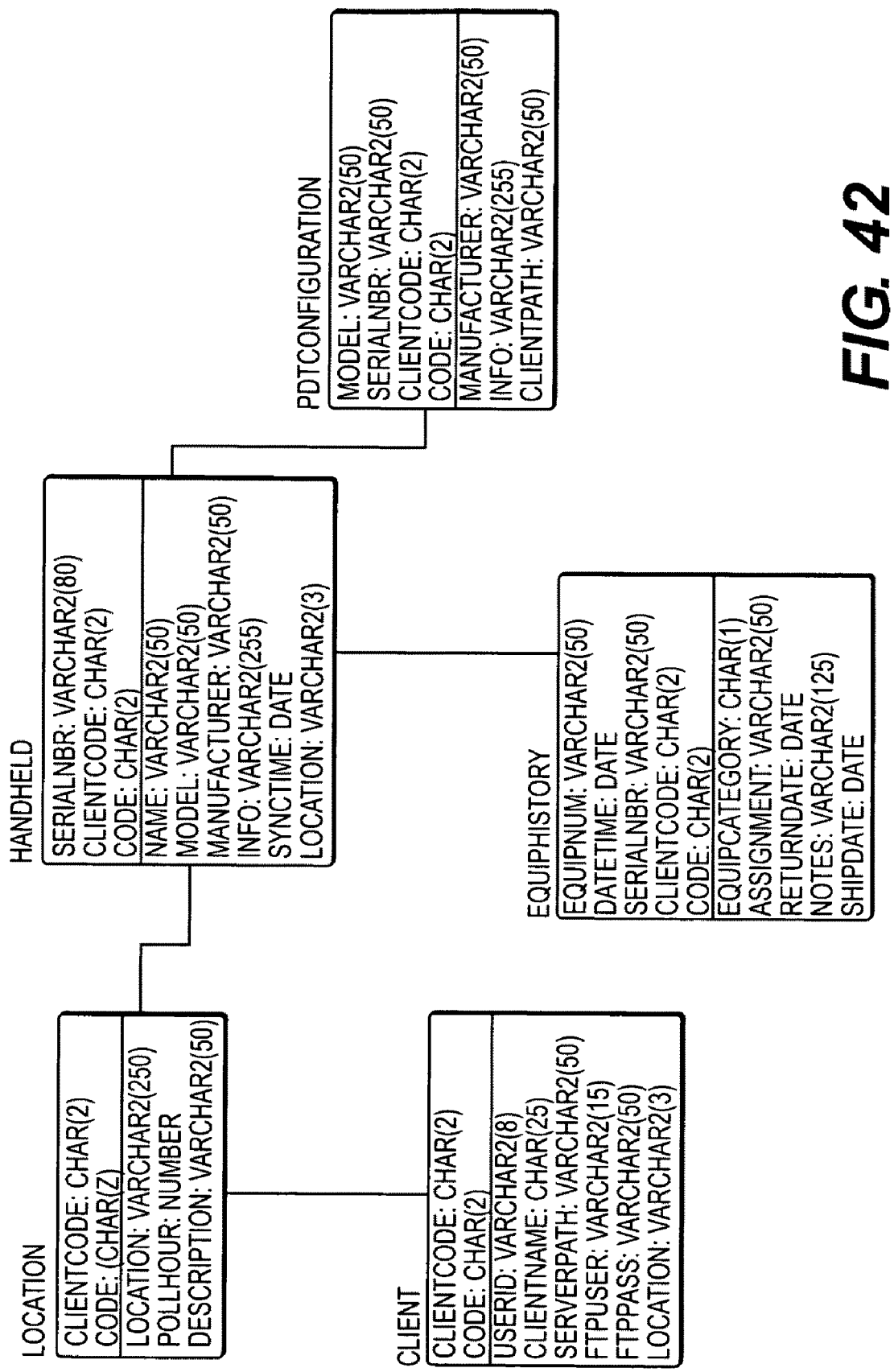
FIG. 42 is a layout of exemplary handheld entry data structures consistent with the principles of the present invention.

Handhelds may be configured for an individual assignment (common reference name (e.g., unit1, badge number (nbr), etc.)), a particular client (e.g., municipality) assigned to an individual location (e.g., agency), and/or configured for a particular manufacturer (e.g., pdtconfiguration). The history of a handheld device may also be tracked and stored in a history table (e.g., equiphistory). In accordance with the principles of the invention, handheld entries may be defined by five (5) physical tables, consisting of location, client, handheld, equiphistory, and pdtconfiguration. Refer to FIG. 42 for an exemplary handheld database table construction and layout.

Figure 43:
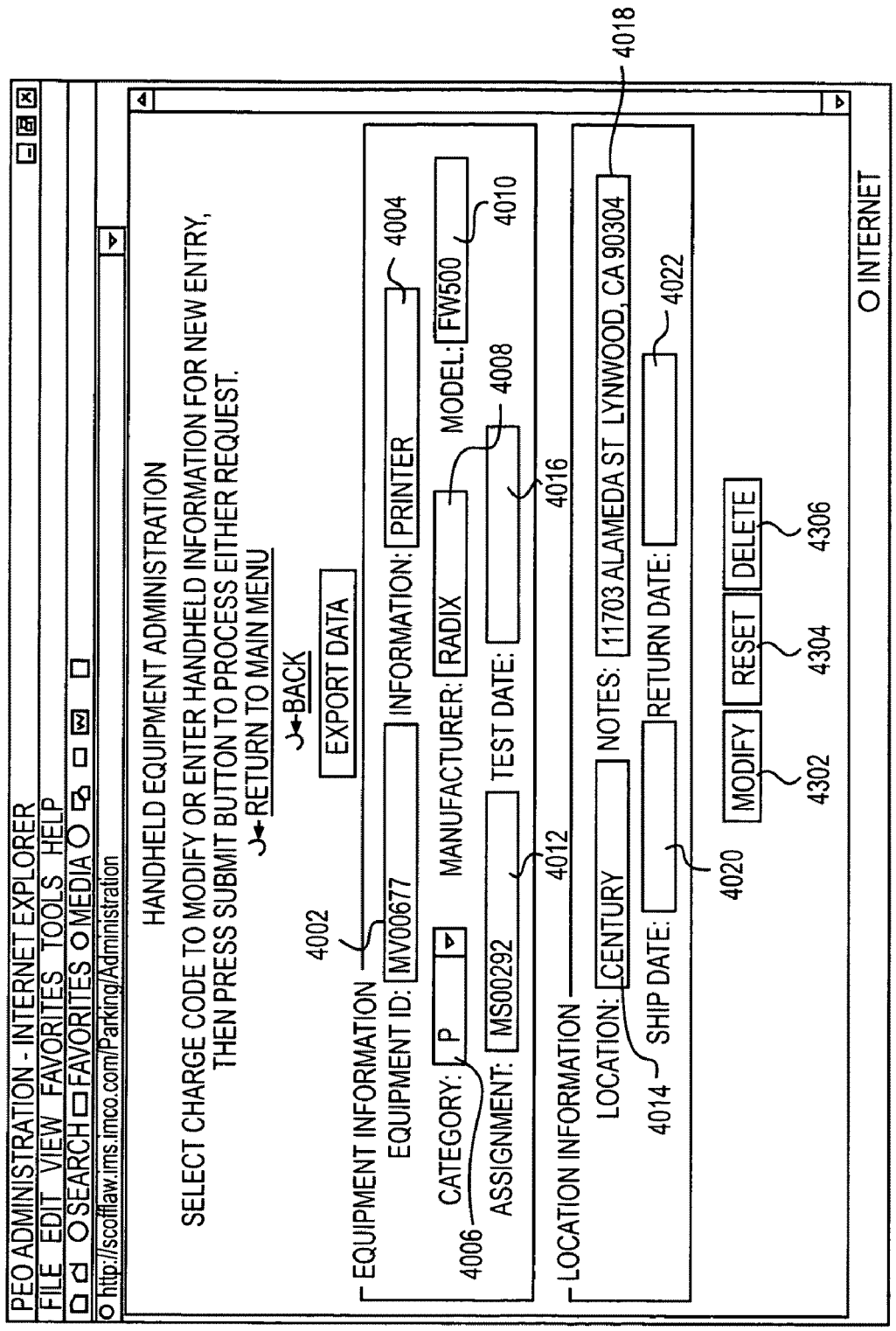
FIG. 43 is an illustration of an exemplary handheld equipment administration screen consistent with the principles of the present invention.

If screen 4000 is displayed using equipment link 2908, a handheld equipment administration screen 4300 (FIG. 43) may follow screen 4000. This screen provides similar data entry items to screen 4000. In addition to the entry of individual handhelds, screen 4300 enables entry of other types of equipment, such as printers, and associates the equipment with a common reference name as mentioned above. At this screen, the user may select a "MODIFY" button 4302, which may be used to modify the equipment information; a "RESET" button 4304, which may be used to clear the screen; or a "DELETE" button 4306, which may be used to deleted the equipment information.

Figure 44:
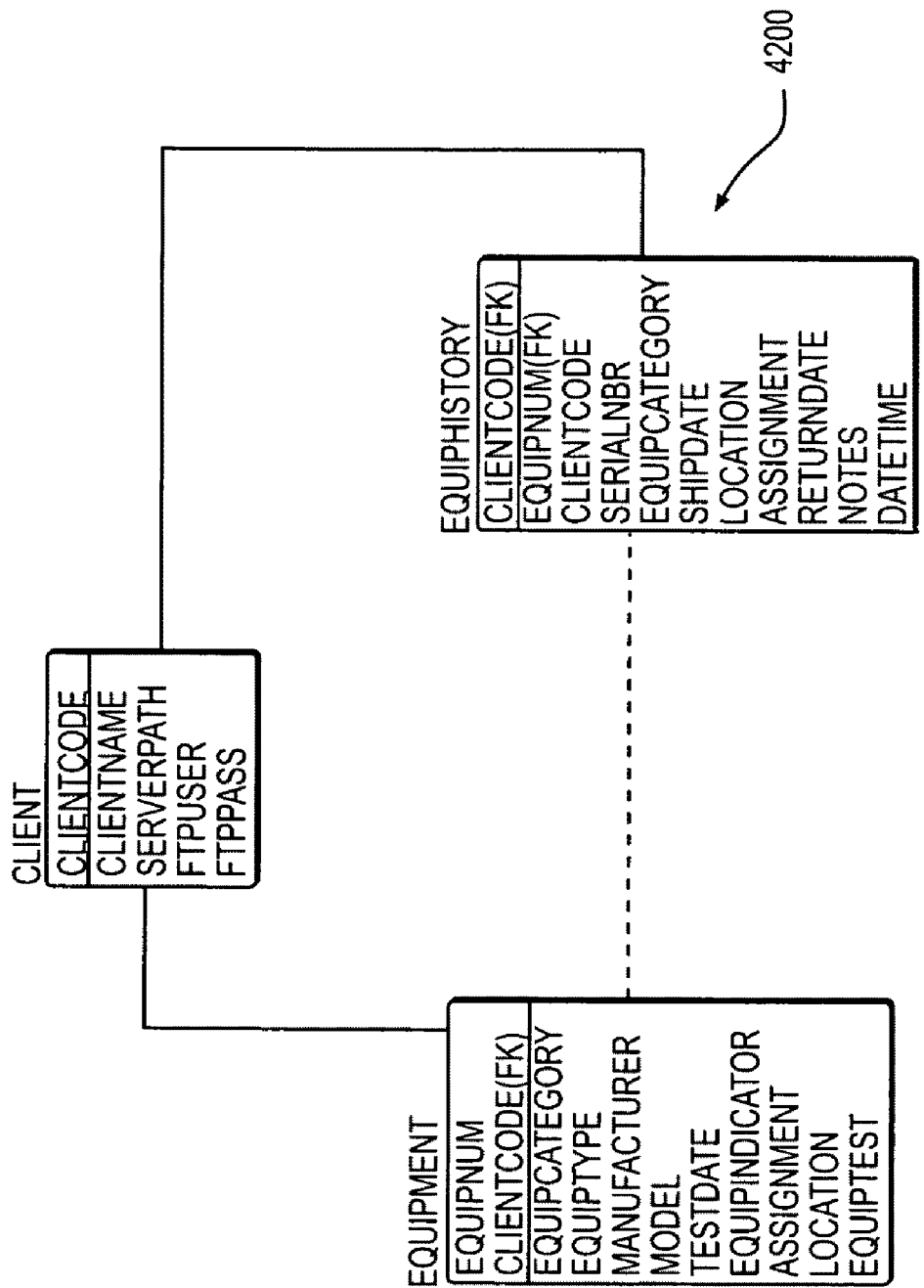
FIG. 44 is a layout of exemplary peripheral equipment data structures consistent with the principles of the present invention.

Peripheral equipment data entries may be defined utilizing physical tables, such as client, equipment, and equiphistory tables. Refer to FIG. 44 for an exemplary "equipment" database table construction and layout.

Figure 45:
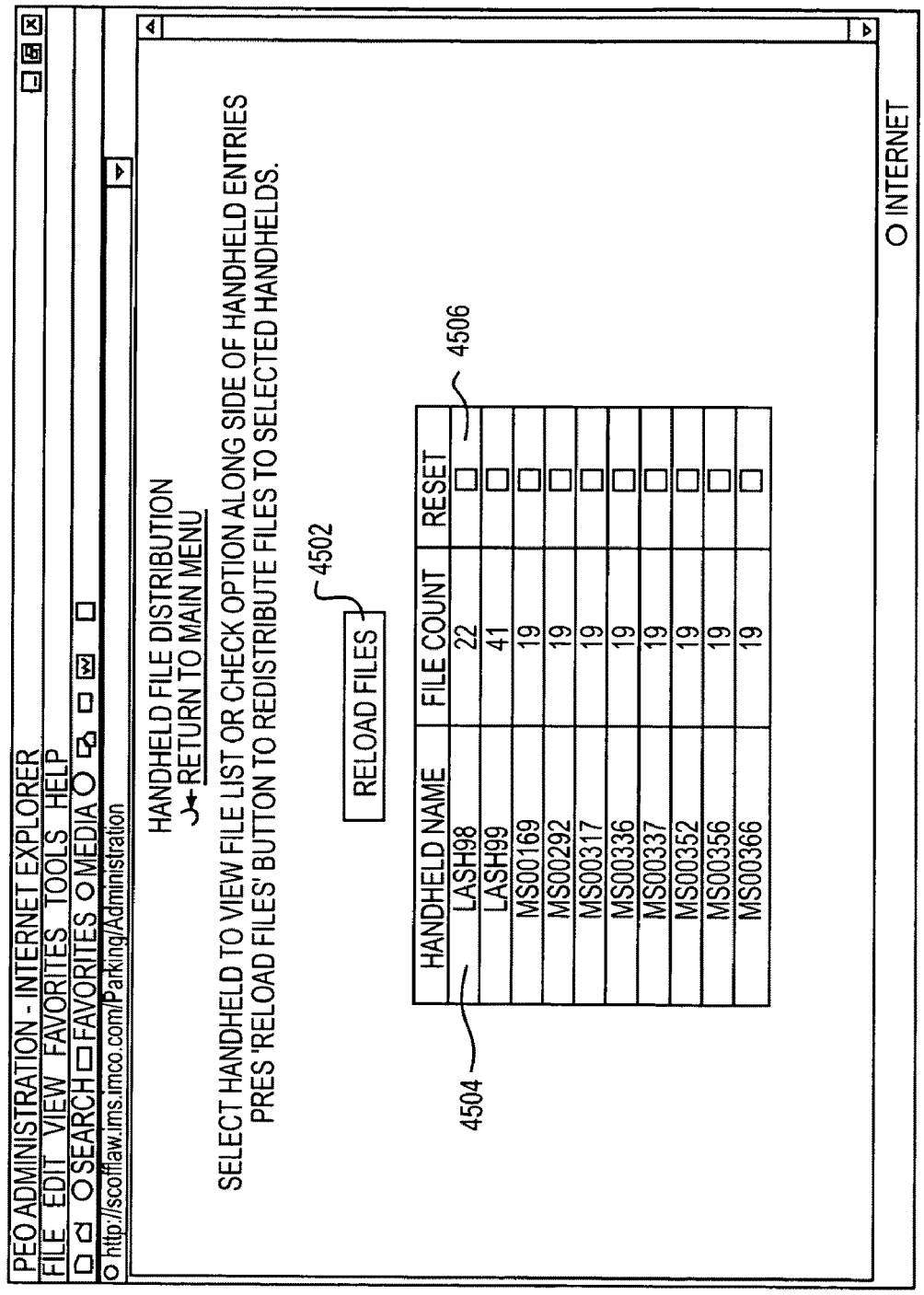
FIG. 45 is an illustration of an exemplary handheld file distribution screen consistent with the principles of the present invention.

Referring back to FIG. 29, if the user selects "file distribution" link 2912, the user may be directed to the Handheld File Distribution screen 4500 (FIG. 45). Screen 4500 may allow handhelds to be downloaded with the current version of files from central processing server 120. Selection of the "reload files" button 4502 initiates redistribution of files to selected handhelds. The "RESET" button may initiate synchronization with central processing server 120 in case a handheld cannot be synchronized with the server. Clicking on a listed handheld name, such as name 4504, may display a second screen such as the screen illustrated in screen 4600 (FIG. 46). This screen displays the current files on each handheld along with the time "stamp" for each file. If "yes" is associated with a listed file, the handheld has acknowledged receipt of the file.

Figure 47:
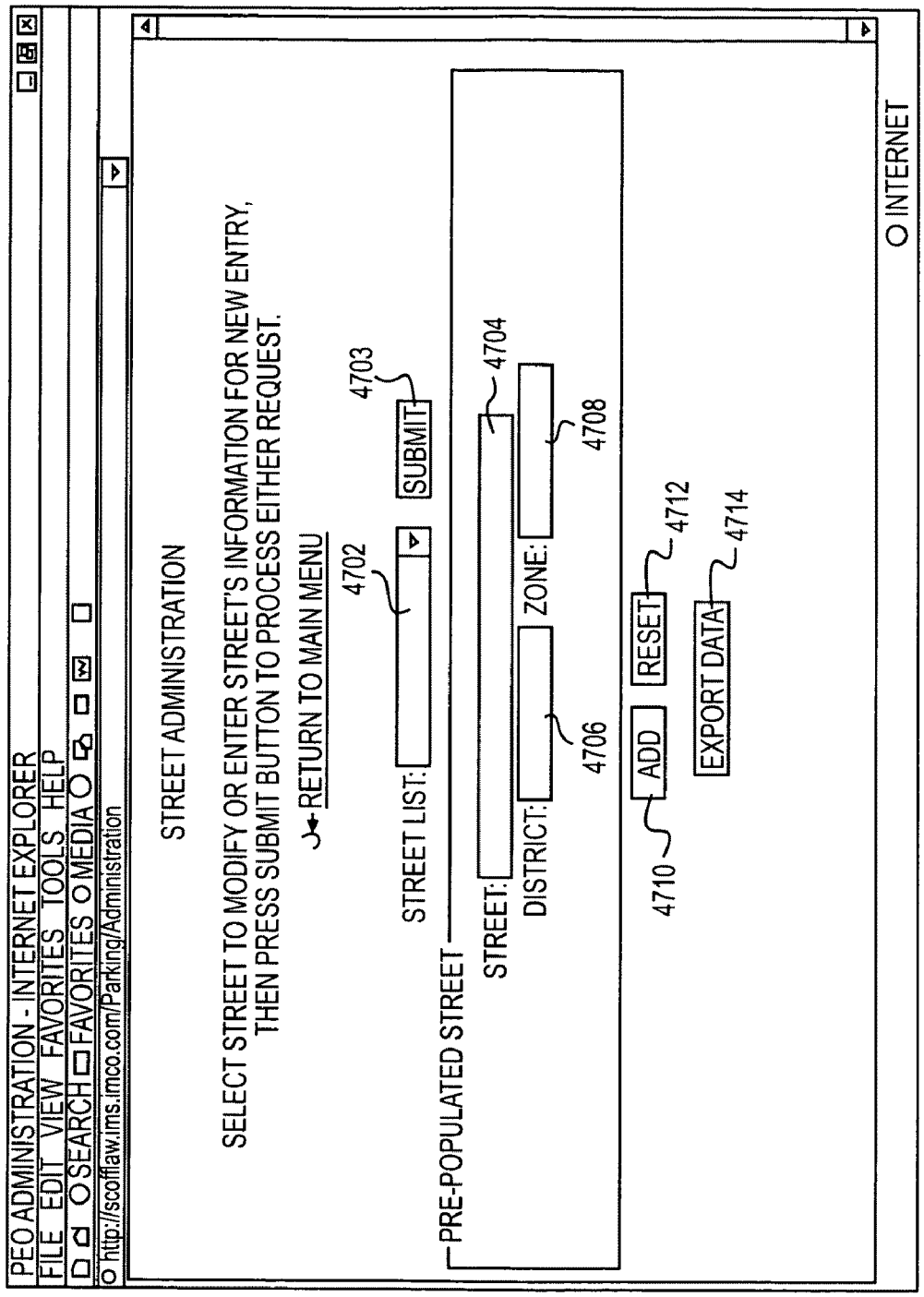
FIG. 47 is an illustration of an exemplary street administration screen consistent with the principles of the present invention.

Selecting the "street" link 2914 in FIG. 29 provides an exemplary street administration screen 4700 (FIG. 47). A drop down menu may support the street list field 4702. Once a user selects a street from street list field 4702 and clicks on the submit button 4703, the other fields, such as a street field 4704, a district field 4706, and a zone field 4708, may be automatically displayed to the user. The user may also select an "ADD" button 4710 to enter new street information, a "RESET" button 4712 to clear the screen, or an "EXPORT" data button 4714 to download the street data to the handhelds.

Figure 48:
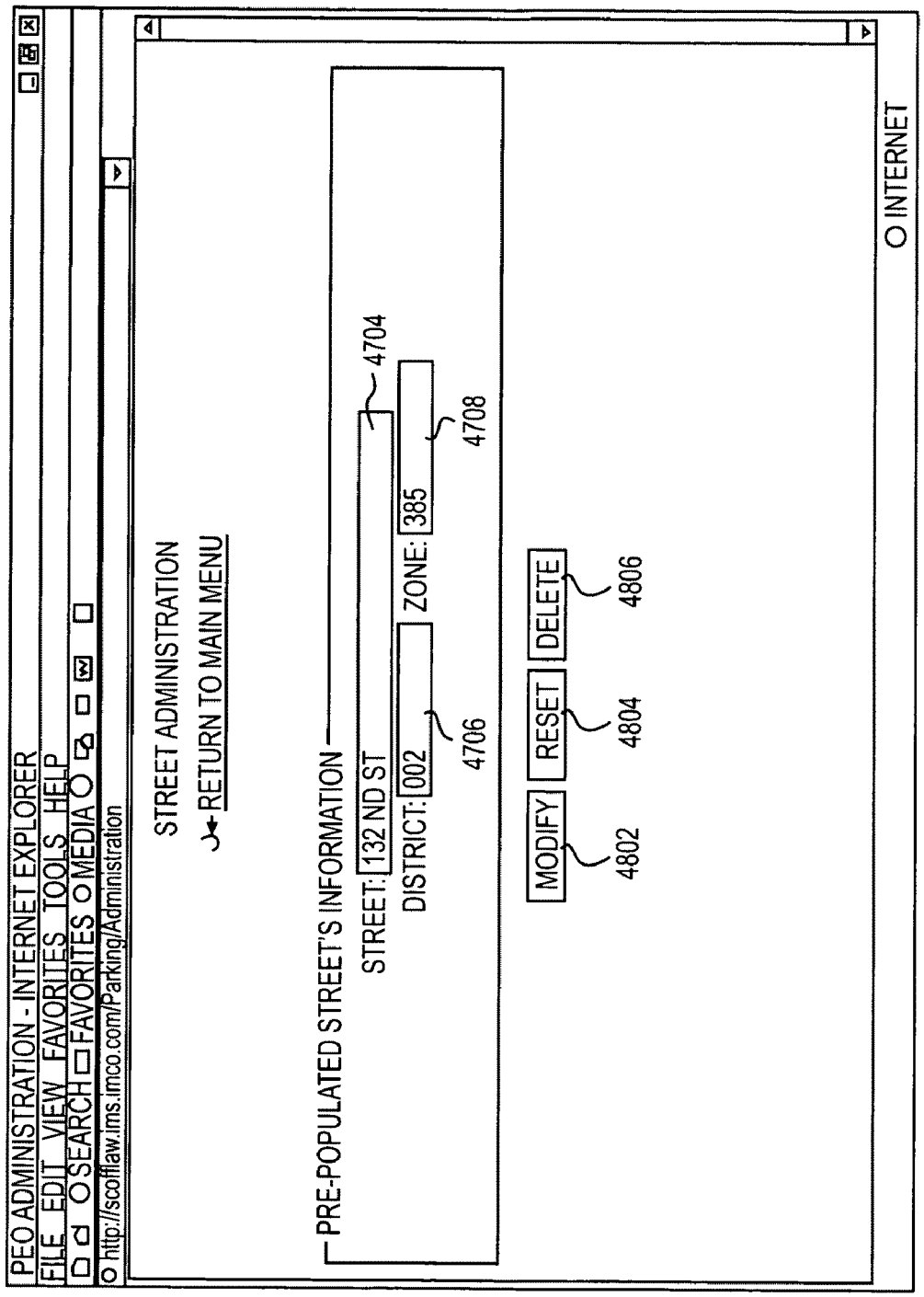
FIG. 48 is an illustration of an exemplary street administrative screen consistent with the principles of the present invention.

In addition to street administrative screen 4700, a street administration screen 4800 (FIG. 48) may be used in conjunction with the street information. At this screen, the user may select a "MODIFY" button 4802, which may be used to modify the street information; a "RESET" button 4804, which may be used to clear the screen; or a "DELETE" button 4806, which may be used to deleted the street information.

Figure 49:
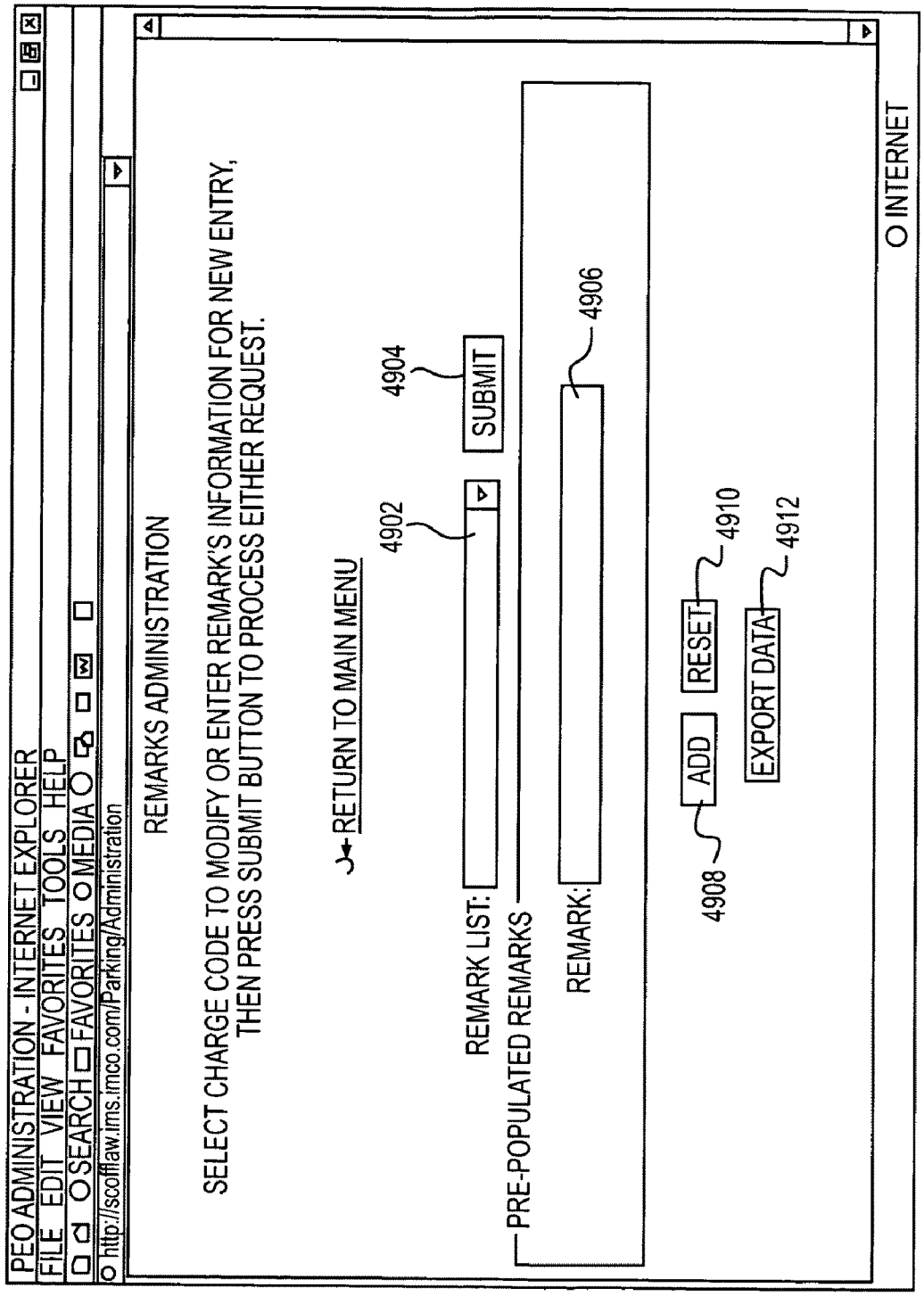
FIG. 49 is an illustration of an exemplary remarks administration screen consistent with the principles of the present invention.
Figure 50:
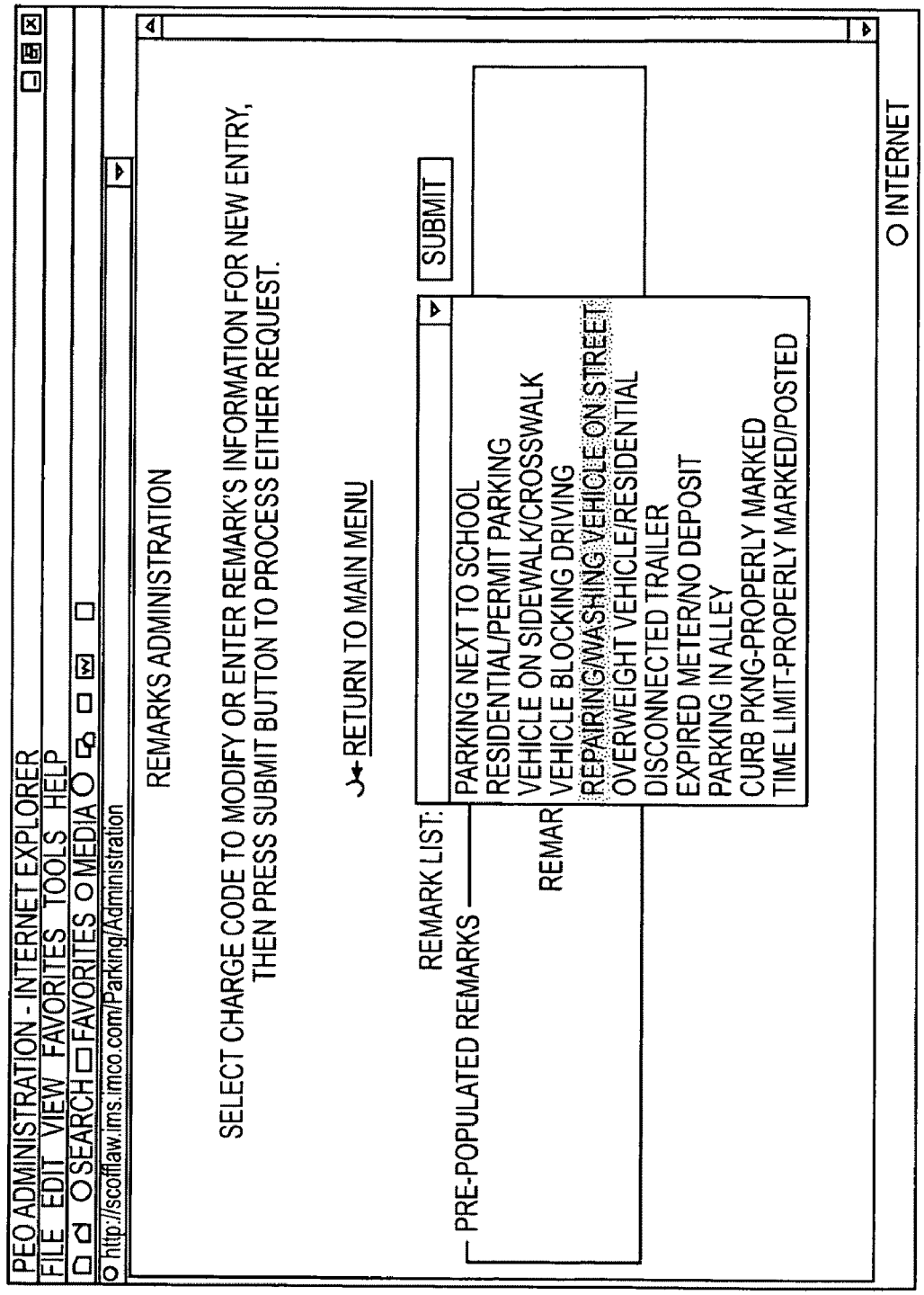
FIG. 50 is an illustration of an exemplary remarks administration screen consistent with the principles of the present invention.

Selecting "remarks/comments" link 2916 in FIG. 29 provides an exemplary remarks administration screen 4900 (FIG. 49). A drop down menu may support a remarks list field 4902. Once a user selects a remark from remarks list field 4902 and clicks on the SUBMIT button 4904, a remarks field 4906 may be automatically displayed to the user. The user may also select the "ADD" button 4908 to enter new remarks information; the "RESET" button 4910 to clear the screen; or the "EXPORT" data button 4912 to download the remarks data to the handhelds. In addition to remarks administration screen 4900, a remarks administration 5000 (FIG. 50) may be used in conjunction with the remarks information.

Figure 51:
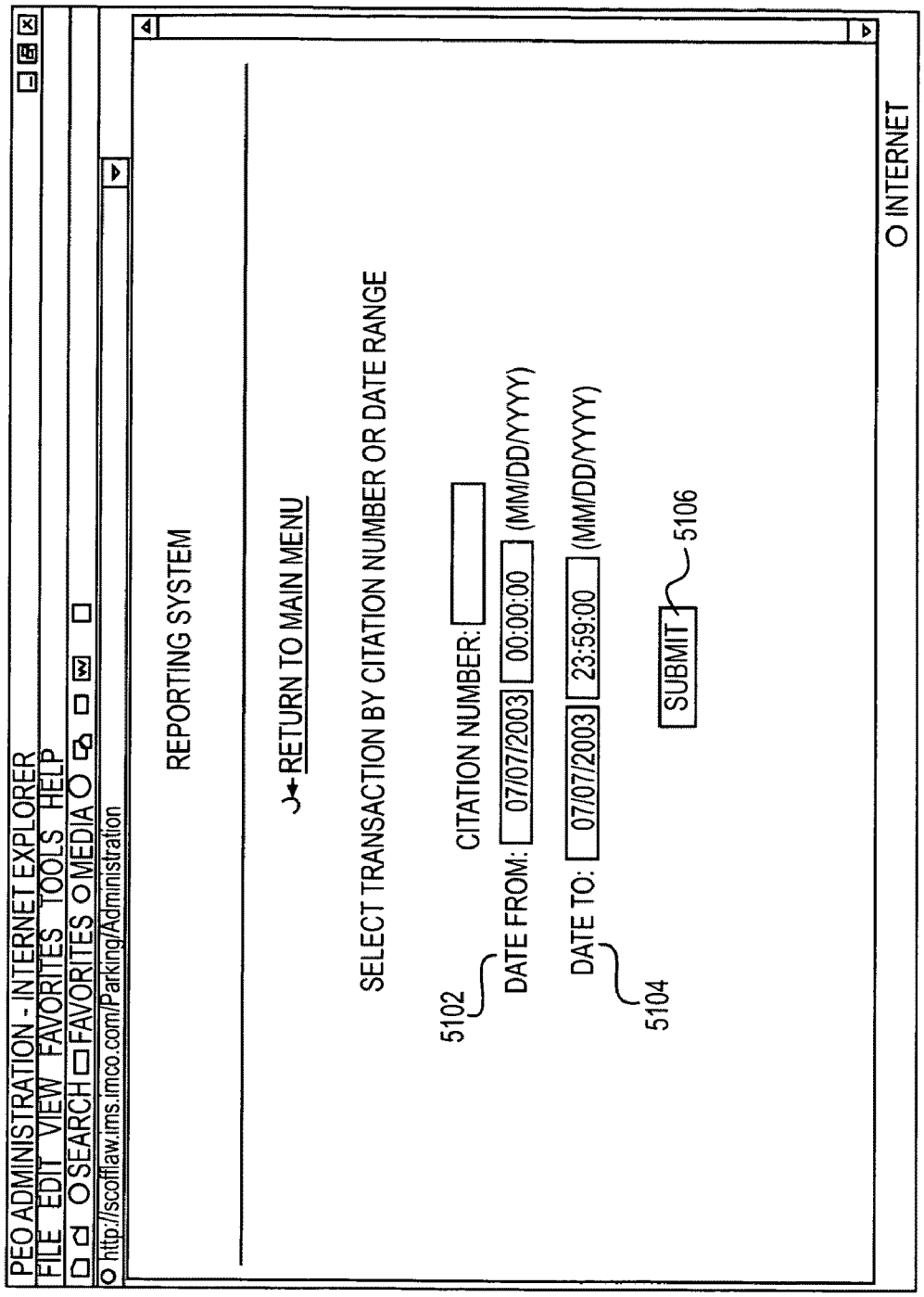
FIG. 51 is an illustration of an exemplary report system screen consistent with the principles of the present invention.

Selecting the "citation transaction report" link 2918 in FIG. 29 provides an exemplary report system screen 5100 (FIG. 51). Entering a date range in fields 5102 and 5104 and clicking on the SUBMIT button 5106 displays an additional screen 5200 (FIG. 52) displaying the active and non-active handhelds for the selected dates, with the uploads and errors for each handheld. If a user selects a handheld from the displayed list, further details, including error information, about the handheld may be displayed.

In one embodiment consistent with the principles of the present invention, administrative website 121 may provide query/report capabilities to display transferred citations, OMS transactions, and track the transfer of information to TIMS server 132 from central processing server 120. Users may access citation status information either by an individual citation number or by a selected date and time range.

The transactions imported in the report reflect the number of transactions/citations that were uploaded from handhelds to central processing server 120. Errors indicated in this report may be either a database insert error or a TIMS delivery error. Database errors may be files that were uploaded from the handhelds but not successfully inserted into the central processing server's database. TIMS delivery errors may be citations that that were sent to TIMS mainframe 132 successfully; however, the corresponding TIMS confirmation file did not contain the individual citation number, leaving the citation in "TRANSFERRED" status.

TIMS mainframe 132 may deliver a "confirmation" file to a predetermined location, configurable within the website per client or agency. Confirmation files may contain every transaction within a previous delivery to TIMS mainframe 132. Periodically, citation import sever application 212 may check for newly arrived confirmation files. These files may be parsed out and each transaction ID contained within the file may be used to update the issuance, activity, and comment tables to reflect the new status of "CONFIRMED", signifying the acceptance of the previously sent data by TIMS mainframe 132.

Figure 53:
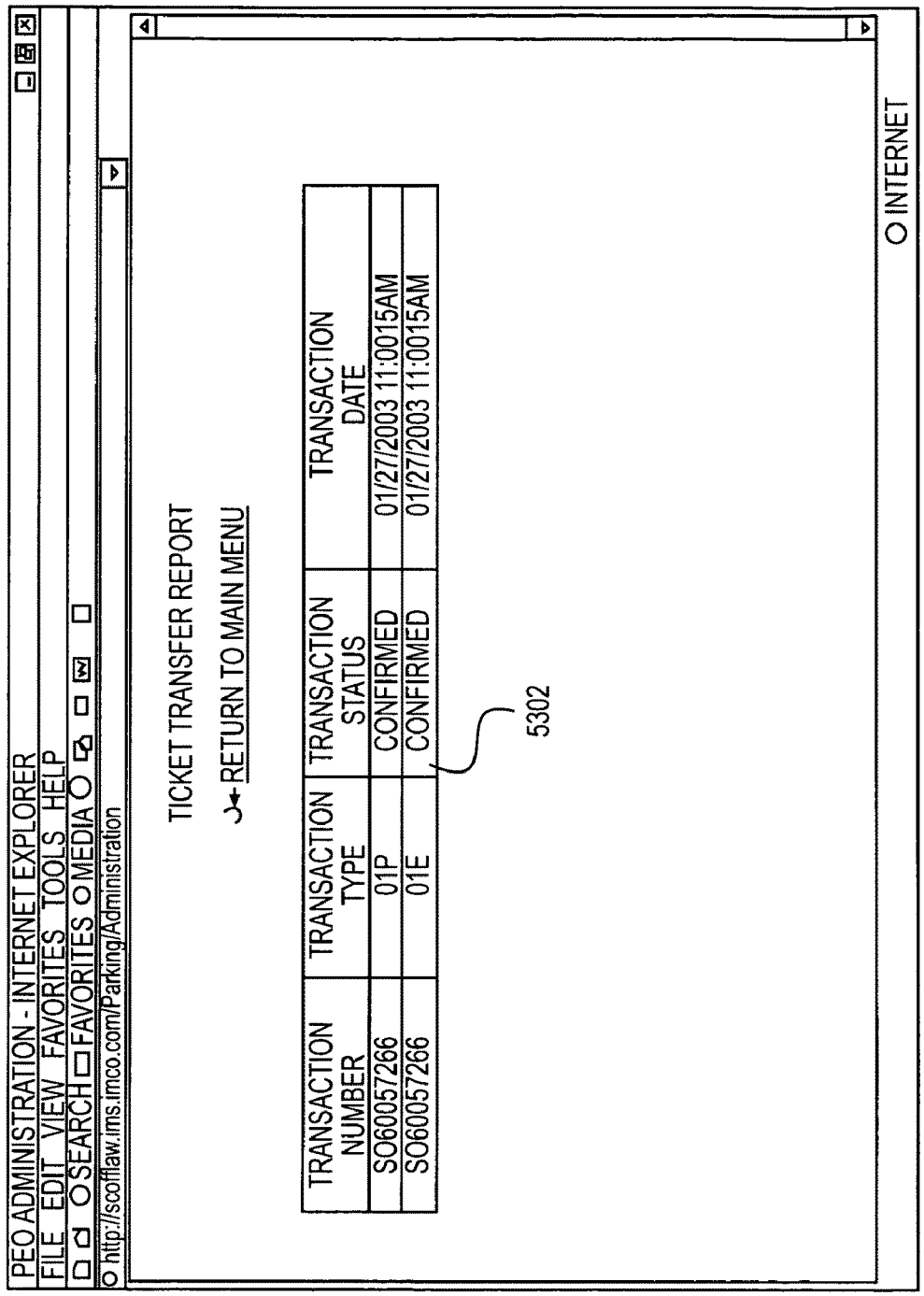
FIG. 53 is an illustration of an exemplary ticket transfer report screen consistent with the principles of the present invention.

FIG. 53 provides an illustration of an exemplary ticket transfer report screen 5300. From this screen, the user may find the exact cause of an error by selecting the appropriate link under transaction status menu 5302.

FIG. 54 provides an illustration of an exemplary transaction summary screen 5400. From this screen, users may view the makeup of a transaction. That is, users may view the actual components of a transaction, such as a citation and comment record. An electronic facsimile of the citation can also be displayed by simply clicking on the citation number link.

Figure 56:
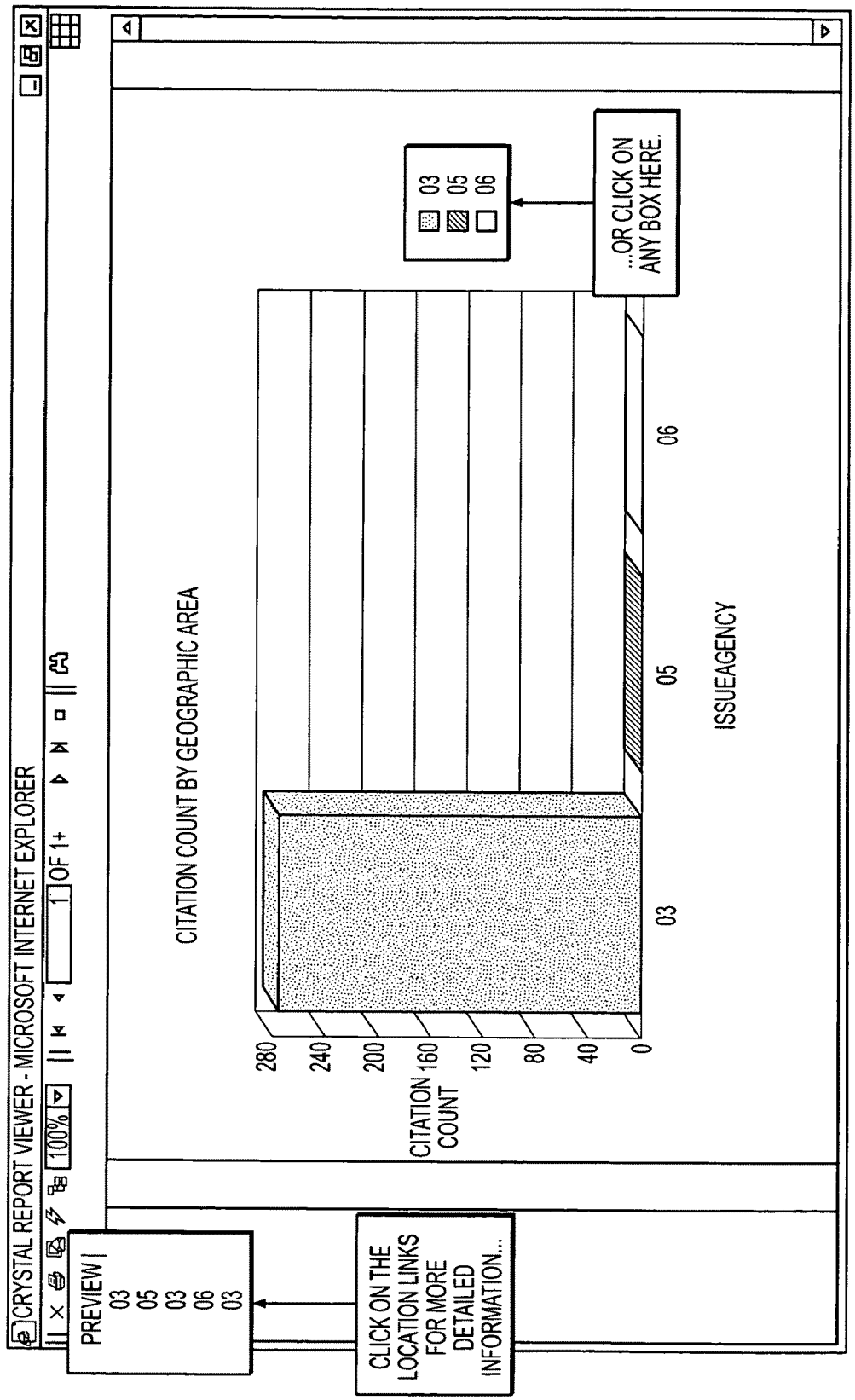
FIG. 56 is an illustration of an exemplary geographical report consistent with the principles of the present invention.
Figure 57:
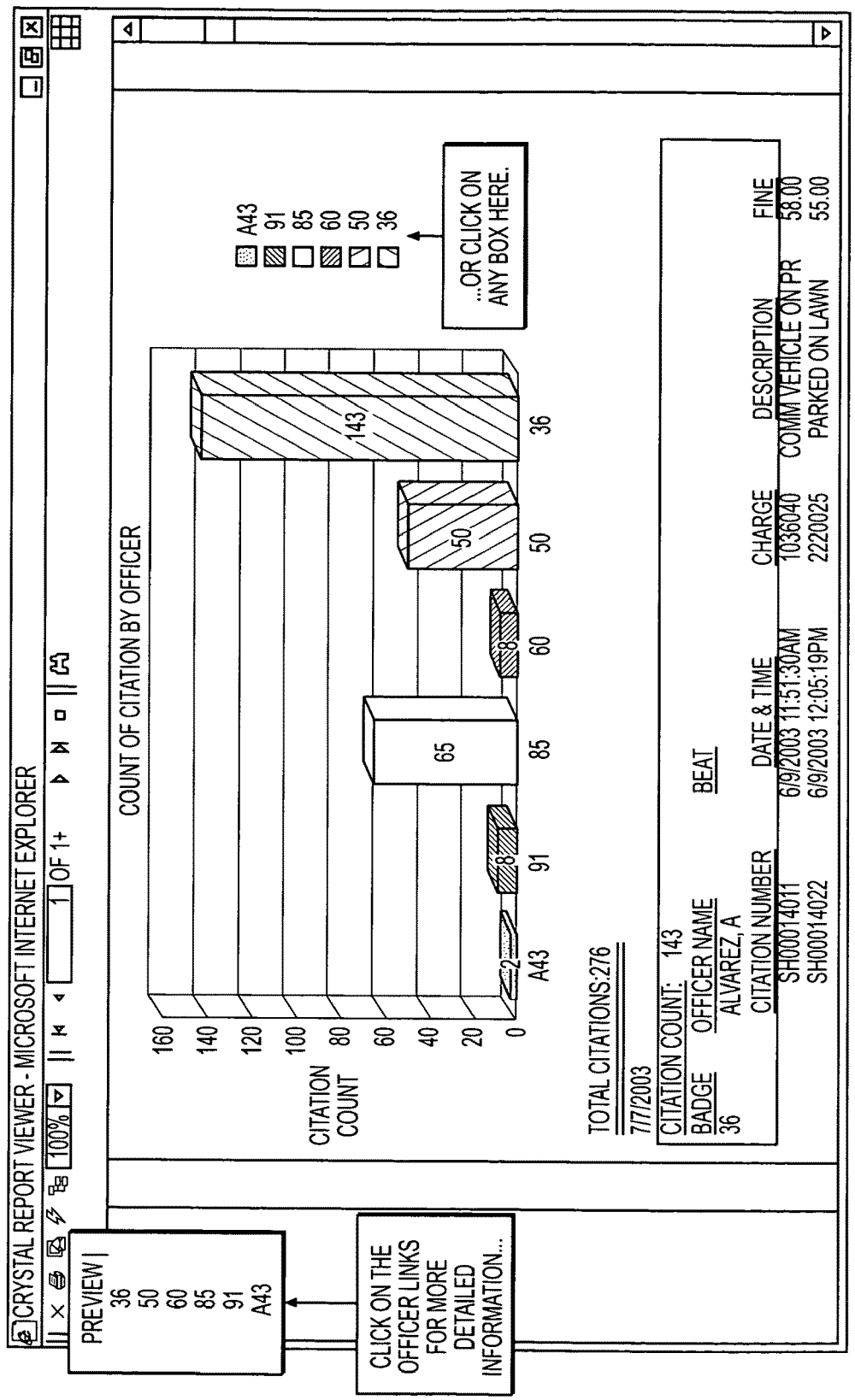
FIG. 57 is an illustration of an exemplary citation by officer report consistent with the principles of the present invention.
Figure 58:
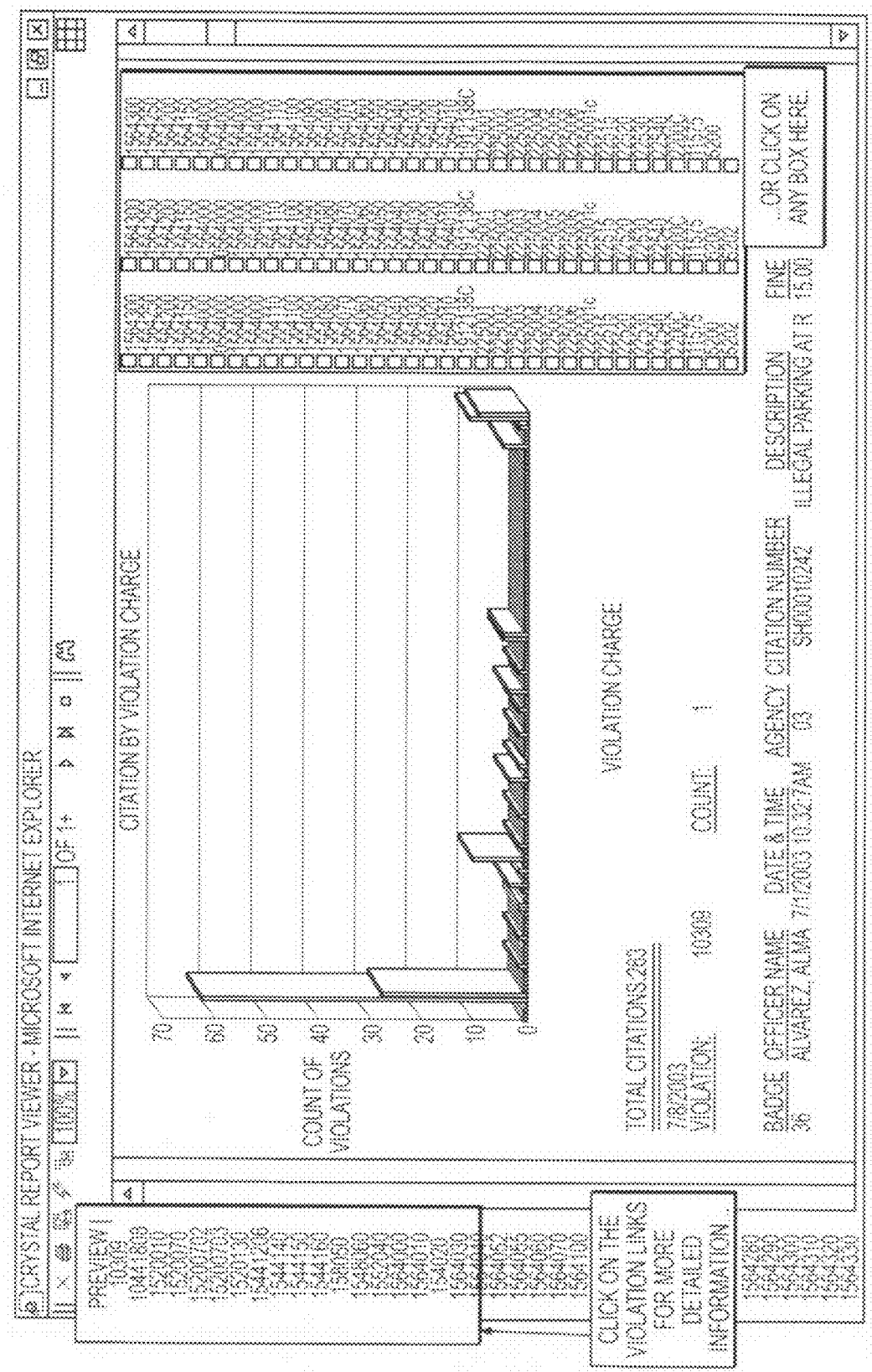
FIG. 58 is an illustration of an exemplary citations by violation report consistent with the principles of the present invention.

Referring back to FIG. 29, if the user selects "citation issuance report" 2920, the user is directed to a administrative report module screen which allows the user to select a location. Once the location is selected, the user may be provided with another administrative report module screen 5500 (FIG. 55). From this screen, the user may use "IssuenceByGeo" link 5502 to initiate a report listing citations by geographical area. FIG. 56 provides an exemplary geographical report. Screen 5500 also allows a user to initiate reports based on issuance by officer (link 5504) and violations by officer (link 5506). Respectively, FIGS. 57 and 58 provide exemplary reports of the issuance and violation by officer reports.

FIG. 59 provides an illustration of exemplary citation data tables 5900. Citations/tickets may consist of four (4) tables. Issuance data may consist of the specific data pertaining to the event. Comments may either be remarks that are printed on the citation (external) or remarks that are printed on the citation (internal). Signature images of the officer and/or the violator for the individual citation may be stored in an image table. All activity performed during the creation of the ticket may be stored in a SystemEvents table. The data in these tables may be initiated by the handheld devices (102-108) or within the administrative website.

Figure 60:
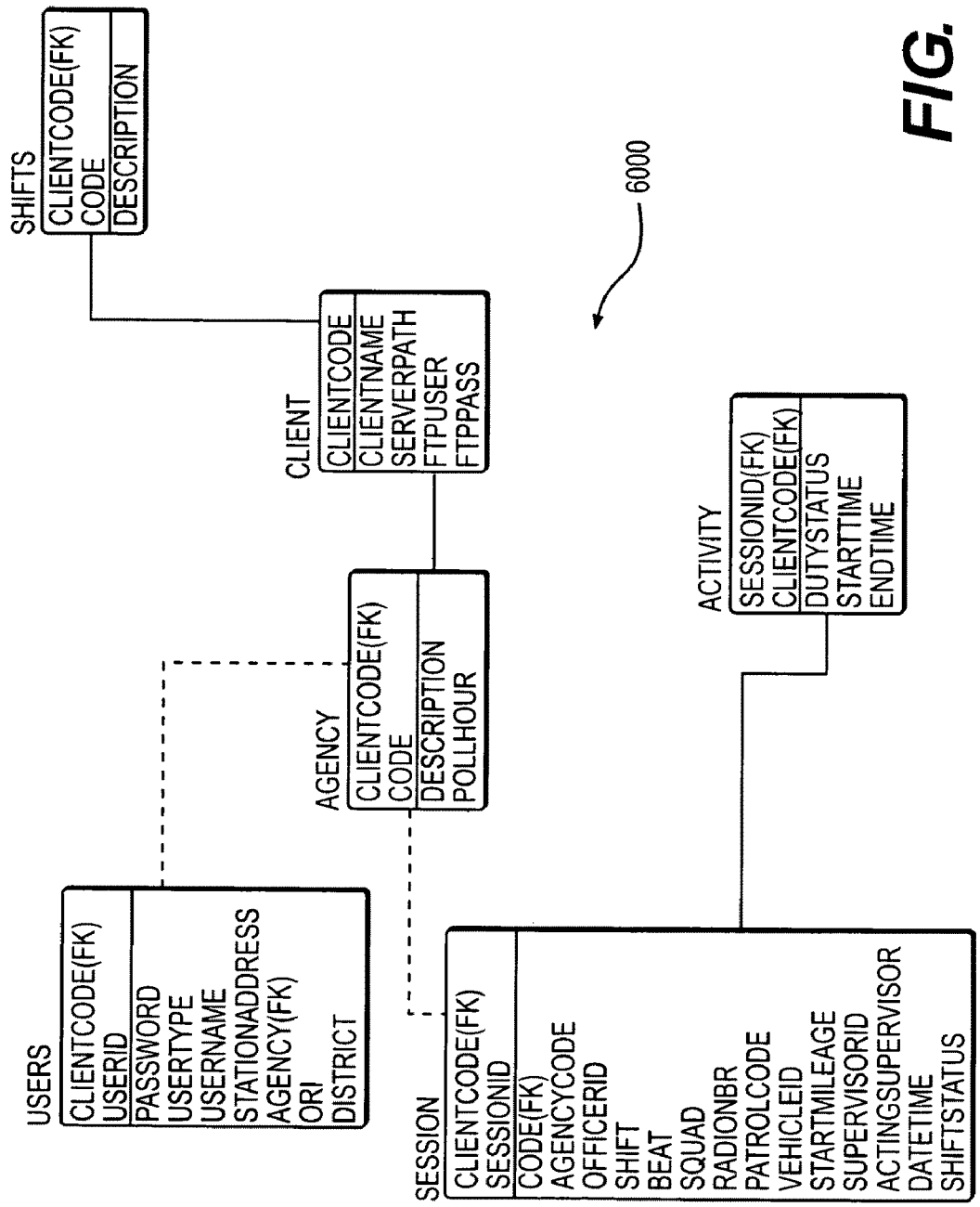
FIG. 60 is a layout of exemplary officer management system data structures consistent with the principles of the present invention.

FIG. 60 provides an illustration of exemplary officer management system tables 6000. These tables may store and track officer activities. Activities may be related to an individual officer assigned to a selected agency. Activities may also be related to a "session"; a session may contain activity since a handheld device was last cradled. A session may also be associated with one or more "shifts".

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A system for acquiring and storing field information for a plurality of jurisdictions, comprising:
   a field information gathering system for each jurisdiction including a plurality of field devices operable to gather field information and receive file information and a cradle comprising a socket to mechanically and electrically connect to the field devices and a communication circuit for transmitting and receiving the field and the file information;
   a network communicatively connected to the field information gathering systems for the plurality of jurisdictions; and
   a central processing system communicatively connected to the network operable to receive field information from each of the field information gathering systems via the network, store the field information for each jurisdiction in a separate data table, and transmit field information for one of the jurisdictions to an administrator corresponding to the one jurisdiction,
   wherein the central processing system further:
      determines if one field device among the plurality of field devices requires updated ticket information for further information gathering; and
      if the updated ticket information is required, transmits the updated ticket information to the one field device.

2. The system of claim 1, the central processing system further comprising a database for accessing the data tables based on the jurisdiction corresponding to the data tables.

3. The system of claim 1, wherein the data tables are further separated according to an agency within each jurisdiction.

4. The system of claim 3, wherein the database accessing the data tables is based on the jurisdiction and the at least one agency.

5. The system of claim 3, wherein the data tables include at least one table including violation codes assigned by each jurisdiction.

6. The system of claim 1, wherein the data tables include at least one table of violation codes assigned by each agency.

7. The system of claim 6, wherein the violation code data tables are grouped in at least one category.

8. The system of claim 1, wherein the data tables include at least one table of information defining the field devices for each jurisdiction.

9. The system of claim 8, wherein the at least one table defining the field devices includes field device identifiers.

10. The system of claim 8, wherein the at least one table defining the field devices includes manufacturer configuration and equipment history information.

11. The system of claim 1, wherein the data tables include at least one table of citation information for each jurisdiction.

12. The system of claim 11, wherein the at least one data table of citation information includes images of an officer or violator signature.

13. The system of claim 1, wherein the field information includes timed parking information used in the issuance of citations.

14. A method, implemented by a processor, for acquiring and storing field information, from a plurality of jurisdictions, comprising:
   receiving field information at field devices in the plurality of jurisdictions;
   transferring, by the processor, the field information and a jurisdiction identifier from each field device to a central processing system via a network;
   batching the field information according to the jurisdiction identifier at the central processing system;
   storing the batched field information in data tables assigned to each jurisdiction;
   determining, by the processor, if jurisdiction-specific updated ticket information is required for further information gathering; and
   if the jurisdiction-specific updated ticket information is required, transmitting, by the processor, the jurisdiction-specific updated ticket information to one of the field devices via the network.

15. The method of claim 14, further including accessing the data tables based on the jurisdictions assigned to the data tables.

16. The method of claim 14, wherein the data tables are formatted based on the jurisdiction and at least one agency.

17. The method of claim 16, further including accessing the data tables based on the jurisdiction and the at least one agency.

18. The method of claim 14, wherein storing the batched field information further includes storing violation codes unique to each jurisdiction.

19. The method of claim 18, further including grouping the violation codes into at least one category.

20. The method of claim 14, wherein storing the field information further includes storing violation codes unique to an agency within one of the jurisdictions.

21. The method of claim 14, wherein storing the batched field information further includes storing field device information in the data tables.

22. The method of claim 21, wherein storing the field device information further includes storing field device identifiers.

23. The method of claim 21, wherein storing the field device information further includes storing manufacturer configuration and equipment history information.

24. The method of claim 14, wherein storing the batched field device information further includes storing citation information in the data tables.

25. The method of claim 24, wherein storing the citation information further includes storing images of an officer or violator signature.

* * * * *